United States Patent
Sakaue et al.

(10) Patent No.: US 9,735,641 B2
(45) Date of Patent: Aug. 15, 2017

(54) ROTARY ELECTRIC MACHINE AND MANUFACTURING METHOD THEREFOR

(71) Applicant: MITSUBISHI ELECTRIC CORPORATION, Chiyoda-ku (JP)

(72) Inventors: Atsushi Sakaue, Tokyo (JP); Hiroyuki Akita, Tokyo (JP); Hironori Tsuiki, Tokyo (JP); Masaya Inoue, Tokyo (JP); Shinkichi Sawa, Tokyo (JP); Masashi Nakamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 341 days.

(21) Appl. No.: 14/418,981

(22) PCT Filed: Aug. 28, 2013

(86) PCT No.: PCT/JP2013/073004
§ 371 (c)(1),
(2) Date: Feb. 2, 2015

(87) PCT Pub. No.: WO2014/034723
PCT Pub. Date: Mar. 6, 2014

(65) Prior Publication Data
US 2015/0171693 A1    Jun. 18, 2015

(30) Foreign Application Priority Data
Aug. 31, 2012  (JP) ................................. 2012-191787
Feb. 19, 2013  (WO) ................. PCT/JP2013/054036

(51) Int. Cl.
*H02K 3/38*     (2006.01)
*H02K 3/04*     (2006.01)
*H02K 15/10*    (2006.01)

(52) U.S. Cl.
CPC ................ *H02K 3/38* (2013.01); *H02K 3/04* (2013.01); *H02K 15/105* (2013.01); *Y10T 29/49009* (2015.01)

(58) Field of Classification Search
CPC .. H02K 3/30; H02K 3/32; H02K 3/38; H02K 15/10; H02K 15/105
(Continued)

(56) References Cited

U.S. PATENT DOCUMENTS

2005/0073208 A1   4/2005   Mitcham
2008/0174197 A1*  7/2008   Fukasaku ................. H02K 3/34
                                                   310/184
(Continued)

FOREIGN PATENT DOCUMENTS

JP     6-284654 A     10/1994
JP   2005-521372 A     7/2005
(Continued)

OTHER PUBLICATIONS

International Search Report (PCT/ISA/210) mailed on Nov. 5, 2013, by the Japanese Patent Office as the International Searching Authority for International Application No. PCT/JP2013/073004.
(Continued)

*Primary Examiner* — Thomas Truong
(74) *Attorney, Agent, or Firm* — Buchanan Ingersoll & Rooney PC

(57) ABSTRACT

Four layers of first coil rows formed by arranging first coil ends at a pitch of one slot in a circumferential direction are arranged in a radial direction to configure a first coil end group, three layers of second coil rows formed by arranging second coil ends at a pitch of one slot in a circumferential direction are arranged in a radial direction to configure a first coil end group, a cylindrical first insulating paper is housed inside the first coil end rows and inside the second coil end
(Continued)

rows, and a cylindrical second insulating paper is housed between the first coil end rows and between the second coil end rows.

16 Claims, 28 Drawing Sheets

(58) Field of Classification Search
USPC .................................................. 310/214, 215
IPC ..................................... H02K 3/32, 3/38, 15/10
See application file for complete search history.

(56) References Cited

U.S. PATENT DOCUMENTS

| 2010/0141078 | A1 | 6/2010 | Kouda et al. |
| 2012/0025658 | A1 | 2/2012 | Watanabe et al. |
| 2013/0127290 | A1* | 5/2013 | Matsubara ............... H02K 3/38 310/208 |

FOREIGN PATENT DOCUMENTS

| JP | 2005-224040 A | 8/2005 |
| JP | 2008154312 A | 7/2008 |
| JP | 2008-236924 A | 10/2008 |
| JP | 2009-95167 A | 4/2009 |
| JP | 2009-112186 A | 5/2009 |
| JP | 2010-193674 A | 9/2010 |
| JP | 2012-125043 A | 6/2012 |
| WO | WO 03/081749 A1 | 10/2003 |
| WO | WO 2011/074114 A1 | 6/2011 |
| WO | WO 2011/148501 A1 | 12/2011 |
| WO | WO 2012011299 A1 * | 1/2012 ............... H02K 3/38 |

OTHER PUBLICATIONS

Written Opinion (PCT/ISA/237) mailed on Nov. 5, 2013, by the Japanese Patent Office as the International Searching Authority for International Application No. PCT/JP2013/073004.
Office Action (Notification of Reason(s) for Refusal) issued on Aug. 4, 2015, by the Japanese Patent Office in corresponding Japanese Application No. 2014-533046, and an English translation of the Office Action. (7 pages).

* cited by examiner

ROTARY ELECTRIC MACHINE AND MANUFACTURING METHOD THEREFOR

TECHNICAL FIELD

The present invention relates to a rotary electric machine such as an electric motor or a generator, for example, and to a manufacturing method therefor, and particularly relates to an armature winding coil end insulating construction.

BACKGROUND ART

Conventional armature windings that are constituted by distributed windings are configured by arranging hexagonal winding bodies at a pitch of one slot in a circumferential direction, the armature windings being configured by winding a conductor wire into pairs of slots that are positioned on two sides of a plurality of circumferentially consecutive teeth. Thus, electric potential differences among conductor wires within identical phases are small, but large electric potential differences act between the conductor wires in different phases. Electric potential differences that are close to a power supply voltage may act between conductor wires in different phases, particularly if the conductor wire of another phase is close to an electric power supplying portion. Thus, partial discharges are more likely to occur if used at high voltages.

In consideration of such conditions, conventional rotary electric machines have been proposed that achieve size reductions as well as high voltage and high output by using different thicknesses or insulating materials in insulating layers in slot portions and in coil end portions to suppress the occurrence of partial discharge in the coil end portions (see Patent Literature 1, for example).

CITATION LIST

Patent Literature

Patent Literature 1: Japanese Patent Laid-Open No. 2008-236924 (Gazette)

SUMMARY THE INVENTION

Problem to be Solved by the Invention

In Patent Literature 1, because thicknesses in the insulating layers are changed between the slot portions and the coil end portions, thickness management of the insulating layers is difficult, and also the step of applying the insulating layers becomes complicated. The step of applying the insulating layers is also complicated in cases in which the material in the insulating layers is changed between the slot portions and the coil end portions.

The present invention aims to solve the above problems and an object of the present invention is to provide a rotary electric machine and a manufacturing method therefor that can achieve size reductions as well as high voltage and high output by adapting construction of winding bodies such that insulating members can be disposed easily between coil ends of different phases to ensure insulation performance in coil end groups.

Means for Solving the Problem

In order to achieve the above object, according to one aspect of the present invention, there is provided a rotary electric machine including: an armature that includes: an annular armature core in which slots are arranged circumferentially; and an armature winding that is mounted to the armature core. The armature winding includes a plurality of winding bodies that are each formed by winding a conductor wire that is covered by an insulating coating, and that include: rectilinear portions; and coil ends that link together end portions of the rectilinear portions between columns, the plurality of winding bodies are arranged circumferentially such that the rectilinear portions of each of the winding bodies are arranged in two columns that are housed in pairs of slots that are separated by an angular pitch of n slots, where n is an integer that is greater than or equal to 2, and 2m of the rectilinear portions are housed in each of the slots so as to line up in a single column in a radial direction, where m is an integer that is greater than or equal to 2. The coil ends include first coil ends that each extend outward from the slot pairs at a first axial end of the armature core, the first coil ends being arranged at a pitch of one slot in a circumferential direction to form a first coil end row, and m layers of the first coil rows being arranged in a radial direction to configure a first coil end group, the coil ends include second coil ends that each extend outward from the slot pairs at a second axial end of the armature core, the second coil ends being arranged at a pitch of one slot in a circumferential direction to form a second coil end row, and (m−1) layers of the second coil rows being arranged in a radial direction to configure a second coil end group, and an insulating member that is different than the insulating coating is disposed inside the first coil end rows, between the first coil end rows, inside the second coil end rows, and between the second coil end rows.

Effects of the Invention

According to the present invention, an insulating member is disposed inside the first coil end rows, between the first coil end rows, inside the second coil end rows, and between the second coil end rows. Thus, interphase insulation can be ensured in the first and second coil end groups without changing the thickness or material of the insulating coating between the rectilinear portions and the first and second coil ends, enabling a rotary electric machine that can achieve high voltage and high output as well as size reductions to be provided.

DESCRIPTION OF EMBODIMENTS

Preferred embodiments of a rotary electric machine and a manufacturing method therefor according to the present invention will now be explained with reference to the drawings.

Embodiment 1

Figure 1:
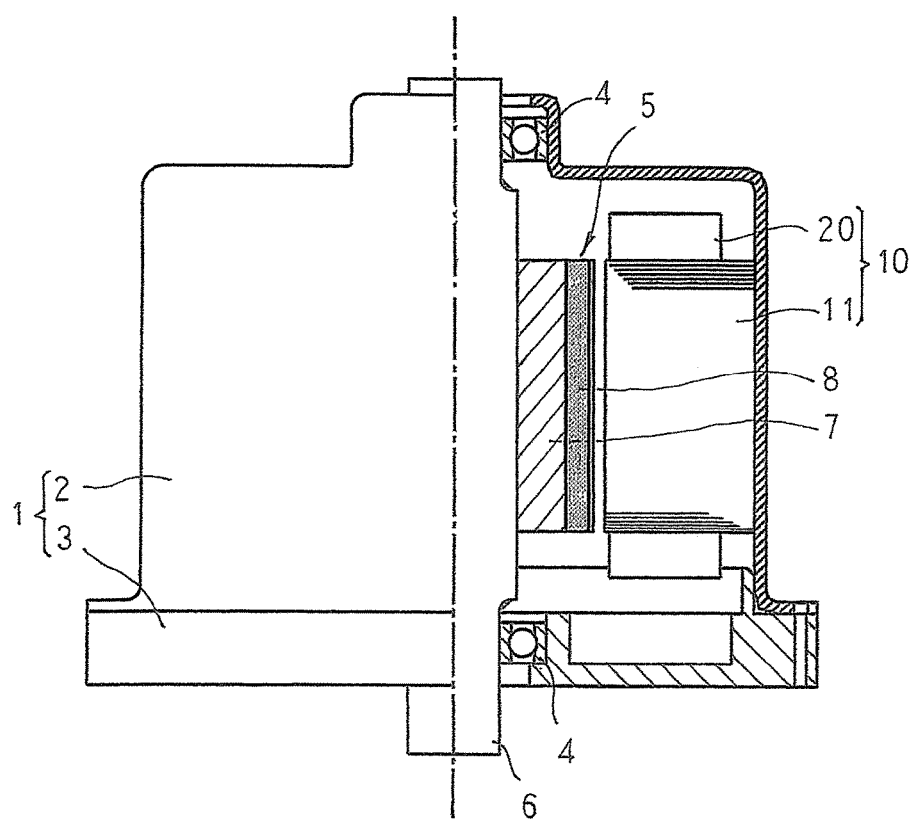
FIG. 1 is a half section that shows a rotary electric machine according to Embodiment 1 of the present invention.
Figure 2:
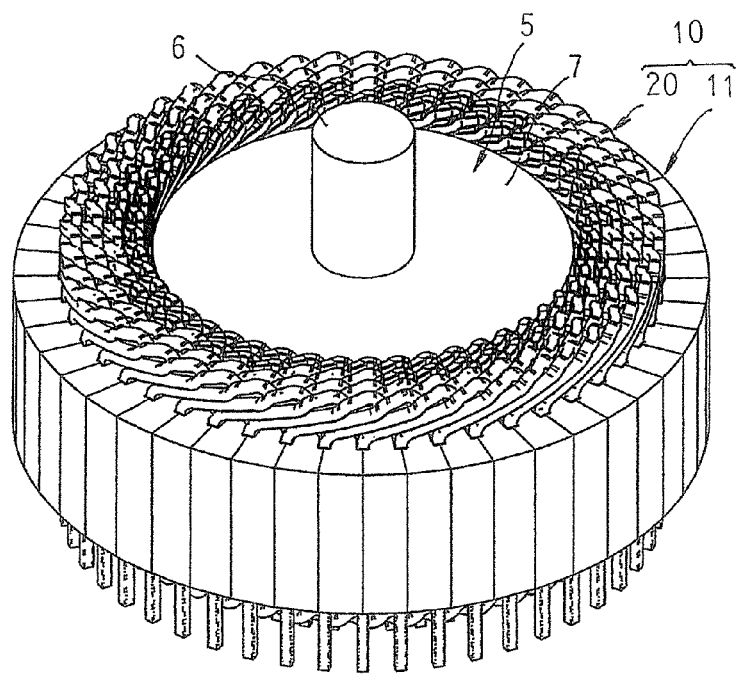
FIG. 2 is an oblique projection that shows part of the rotary electric machine according to Embodiment 1 of the present invention.
Figure 3:
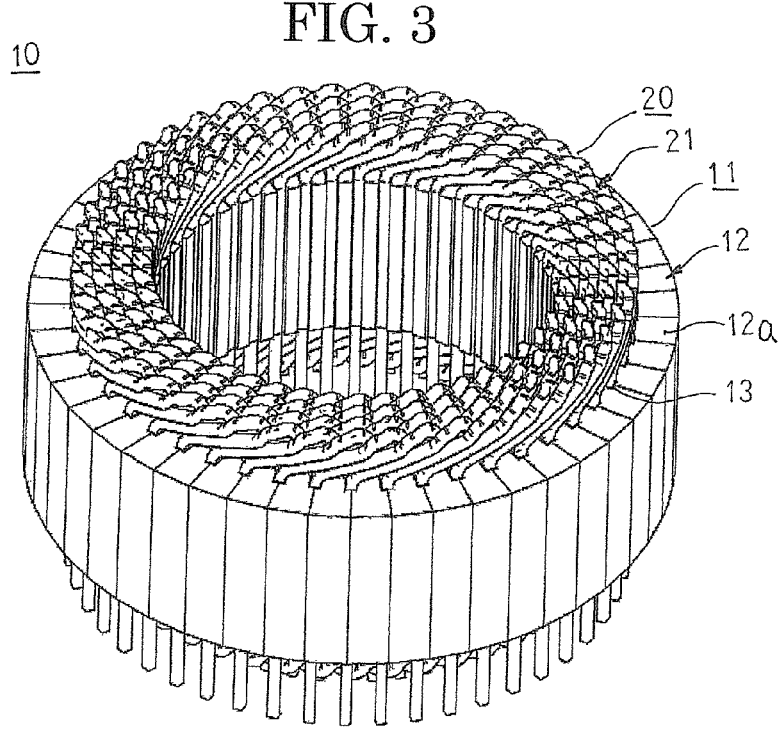
FIG. 3 is an oblique projection that shows an armature that is used in the rotary electric machine according to Embodiment 1 of the present invention.
Figure 4:
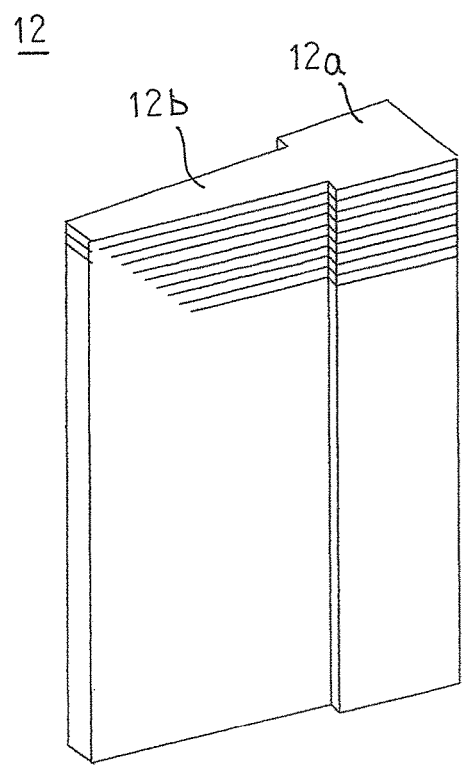
FIG. 4 is an oblique projection that shows a core block that constitutes the armature that is used in the rotary electric machine according to Embodiment 1 of the present invention.
Figure 5:
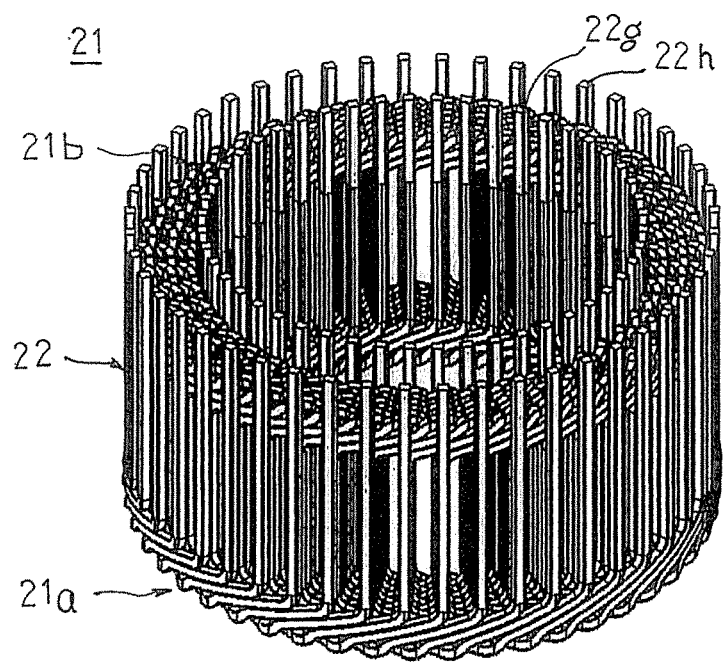
FIG. 5 is an oblique projection that shows a winding assembly that constitutes an armature winding of the armature that is used in the rotary electric machine according to Embodiment 1 of the present invention.
Figure 6:
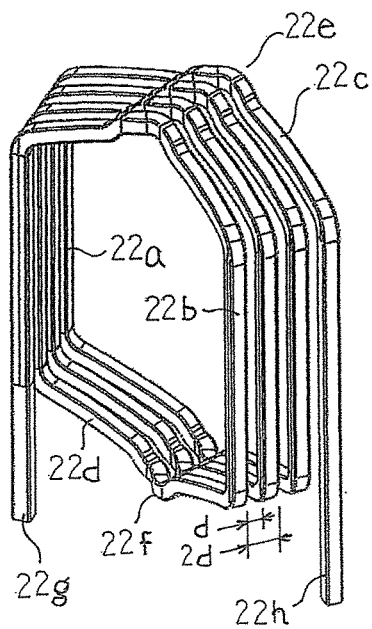
FIG. 6 is an oblique projection that shows a winding body that constitutes the winding assembly in the rotary electric machine according to Embodiment 1 of the present invention.
Figure 7:
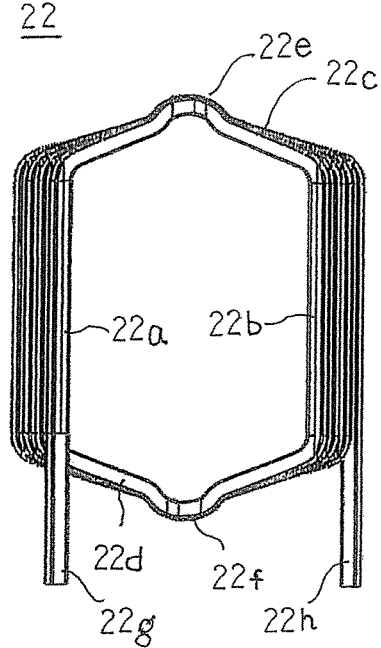
FIG. 7 is a front elevation that shows the winding body that constitutes the winding assembly in the rotary electric machine according to Embodiment 1 of the present invention.
Figure 8:
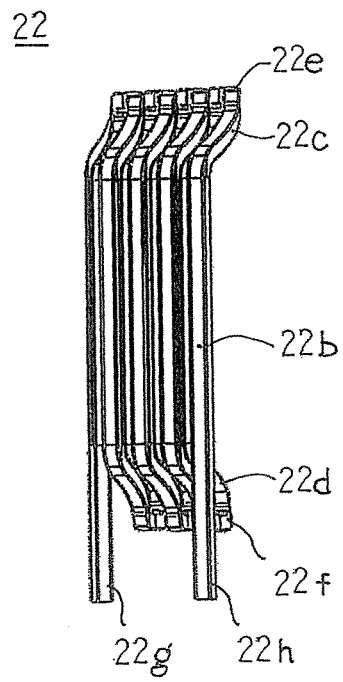
FIG. 8 is a side elevation that shows the winding body that constitutes the winding assembly in the rotary electric machine according to Embodiment 1 of the present invention.
Figure 9:
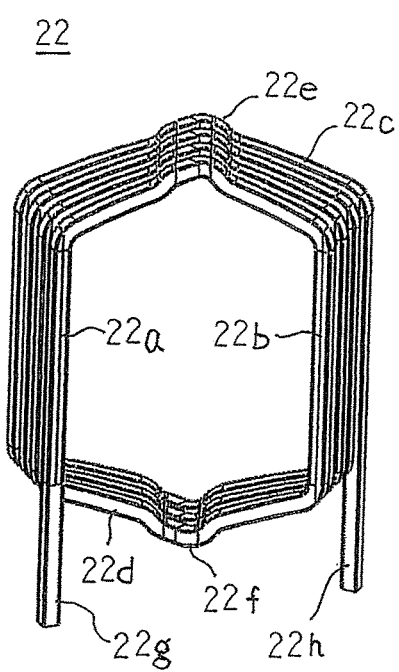
FIG. 9 is an oblique projection of the winding body that constitutes the winding assembly in the rotary electric machine according to Embodiment 1 of the present invention when viewed from obliquely above a front surface.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes an armature that is used in the rotary electric machine according to Embodiment 1 of the present invention, FIG. 5 is an oblique projection that shows a winding assembly that constitutes an armature winding of the armature that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows the winding body that constitutes the winding assembly in the rotary electric machine according to Embodiment 1 of the present invention, FIG. 8 is a side elevation that shows the winding body that constitutes the winding assembly in the rotary electric machine according to Embodiment 1 of the present invention, and FIG. 9 is an oblique projection of the winding body that constitutes the winding assembly in the rotary electric machine according to Embodiment 1 of the present invention when viewed from obliquely above a front surface. Moreover, insulating papers 25 are omitted from FIGS. 2 and 3 for simplicity.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded near an outer circumferential surface of the rotor core 7 so as to be arranged at a set pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; and an armature winding 20 that is mounted onto the armature core 11. Here, to facilitate explanation, the number of poles in the rotor 5 is eight, the number of slots in the armature core 11 is forty-eight, and the armature winding 20 is a three-phase winding. In other words, the slots 13 are formed on the armature core 11 at a ratio of two slots per phase per pole. Moreover, the number of slots per phase per pole is two.

As shown in FIG. 4, core blocks 12 are made by dividing the annular armature core 11 into forty-eight equal sections circumferentially, and include: a core back portion 12a that has a circular arc-shaped cross section, that is produced by laminating and integrating a set number of electromagnetic steel sheets that have been punched out into set shapes; and a tooth 12b that is disposed so as to protrude radially inward from an inner circumferential wall surface of the core back portion 12a.

The armature core 11 is configured into an annular shape by arranging and integrating forty-eight core blocks 12 circumferentially by abutting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. Moreover, the teeth 12b are formed so as to have a tapered shape in which a circumferential width becomes gradually narrower radially inward, and a cross section of the slots 13 is rectangular.

As shown in FIG. 3, the armature winding 20 is configured by applying a set connection process to the winding assembly 21 that is mounted to the armature core 11. As shown in FIG. 5, the winding assembly 21 is configured by arranging winding bodies 22 that are housed in pairs of slots 13 that are positioned on two sides of six consecutive teeth 12b circumferentially at a pitch of one slot. Winding ends 22g (described below) each project axially outward, and are arranged on a radially inner side of the winding assembly 21 at a pitch of one slot circumferentially. Winding ends 22h (described below) each project axially outward in an identical direction to the winding ends 22g, and are arranged on a radially outer side of the winding assembly 21 at a pitch of one slot circumferentially.

As shown in FIGS. 6 through 9, the winding bodies 22 are hexagonal coils that are configured by winding conductor wire 19 that has a rectangular cross section that is made of unjointed continuous copper wire or aluminum wire that is insulated using an enamel resin, for example, for four turns helically into an approximate hexagon shape such that flat surfaces that are constituted by long sides of the rectangular cross sections face each other, and such that a gap d that is approximately equal to a length of short sides of the rectangular cross section is ensured between the facing flat surfaces in question. The winding bodies 22 are produced by winding the conductor wire for four turns helically into an edgewise winding to produce a tubular coil body, and subsequently shaping the coil body into an approximate hexagon shape using a coil shaping machine, for example. Alternatively, the winding bodies 22 may be produced by a folding and bending process so as to bend a conductor wire into an approximate hexagon shape while winding it helically. Moreover, the winding bodies 22 are produced using conductor wire 19 that has a rectangular cross section, but conductor wire that has a circular cross section may be used.

The winding bodies 22 include: first and second rectilinear portions 22a and 22b that form two columns that are separated by an angular pitch of six slots in which four of each are arranged in a direction of short sides of the rectangular cross sections so as to leave gaps d in each of the columns; and first and second coil ends 22c and 22d that alternately link first longitudinal ends to each other and second longitudinal ends to each other between the columns of first and second rectilinear portions 22a and 22b. Moreover, an angular pitch of six slots is a pitch between slot centers of slots 13 on two sides of six consecutive teeth 12b, and corresponds to a pitch of one magnetic pole.

The first coil ends 22c extend outward at a set inclination longitudinally outward relative to the first and second rectilinear portions 22a and 22b from first ends of first rectilinear portions 22a in a first column toward second rectilinear portions 22b in a second column, are bent approximately at right angles at central portions (first top portions 22e) between the columns of the first and second rectilinear portions 22a and 22b and displaced in a direction of arrangement of the first and second rectilinear portions 22a and 22b so as to leave a gap d, and are subsequently bent approximately at right angles and extend longitudinally inward relative to the first and second rectilinear portions 22a and 22b toward the second rectilinear portions 22b in the second column at a set inclination, and are connected to first ends of the second rectilinear portion 22b in the second column.

Similarly, the second coil ends 22d extend outward at a set inclination longitudinally outward relative to the first and second rectilinear portions 22a and 22b from second ends of second rectilinear portions 22b in the second column toward first rectilinear portions 22a in the first column, are bent approximately at right angles at central portions (second top portions 22f) between the columns of the first and second rectilinear portions 22a and 22b and displaced in a direction of arrangement of the first and second rectilinear portions 22a and 22b so as to leave a gap d, and are subsequently bent approximately at right angles and extend longitudinally inward relative to the first and second rectilinear portions 22a and 22b toward the first rectilinear portions 22a in the first column at a set inclination, and are connected to second ends of the first rectilinear portions 22a in the first column.

In winding bodies 22 that are configured in this manner, the first and second rectilinear portions 22a and 22b, and the first and second coil ends 22c and 22d, are each arranged in the direction of the short sides of the rectangular cross sections of the conductor wire 19 at a pitch (2d) that is approximately twice the length of the short sides such that flat surfaces that are constituted by the long sides of the rectangular cross sections of the conductor wire 19 face each other. The first rectilinear portions 22a and the second rectilinear portions 22b, which are connected by means of the first top portions 22e and the second top portions 22f, are offset in the direction of arrangement so as to leave a gap d. The winding bodies 22 also include: a winding end 22g that extends outward in the longitudinal direction from the second end of a first rectilinear portion 22a that is positioned at a first end in the direction of arrangement in the first column; and a winding end 22h that extends outward in the longitudinal direction from the second end of a second rectilinear portion 22b that is positioned at a second end in the direction of arrangement in the second column. In other words, the winding ends 22g and 22h project in identical directions in, a longitudinal direction of the first and second rectilinear portions 22a and 22b from diagonally opposite positions at a second end of the winding bodies 22.

Figure 14:
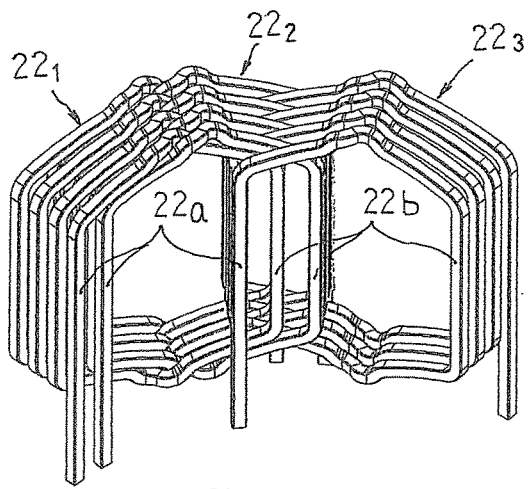
FIG. 14 is an oblique projection that explains the method for assembling a winding assembly in the rotary electric machine according to Embodiment 1 of the present invention.
Figure 15:
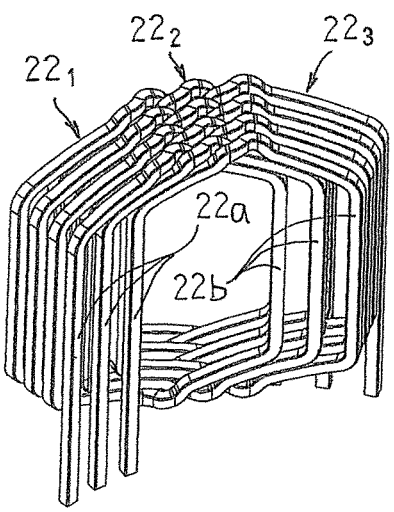
FIG. 15 is an oblique projection that explains the method for assembling a winding assembly in the rotary electric machine according to Embodiment 1 of the present invention.
Figure 16:
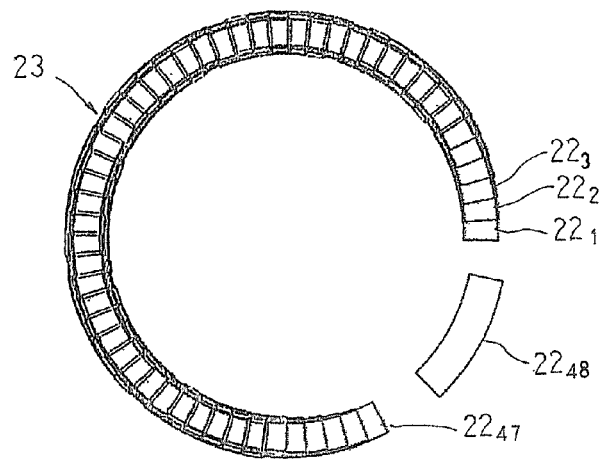
FIG. 16 is a schematic diagram that explains a procedure for installing a forty-eighth winding body in the method for assembling a winding assembly in the rotary electric machine according to Embodiment 1 of the present invention.
Figure 17:
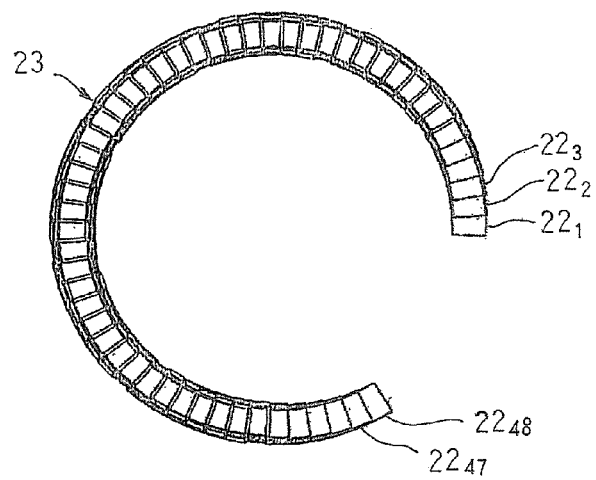
FIG. 17 is a schematic diagram that explains the procedure for installing the forty-eighth winding body in the method for assembling a winding assembly in the rotary electric machine according to Embodiment 1 of the present invention.
Figure 18:
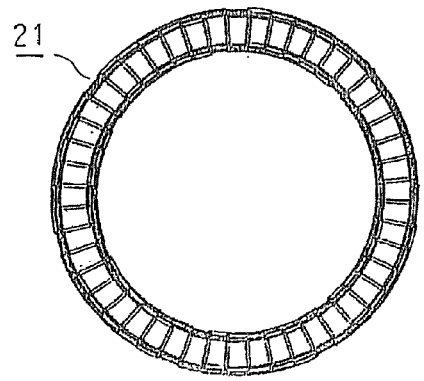
FIG. 18 is a schematic diagram that explains the procedure for installing the forty-eighth winding body in the method for assembling a winding assembly in the rotary electric machine according to Embodiment 1 of the present invention.

Next, a method for assembling the winding assembly 21 will be explained with reference to FIGS. 10 through 18. FIGS. 10 through 15 are oblique projections that explain a method for assembling the winding assembly in the rotary electric machine according to Embodiment 1 of the present invention, and FIGS. 16 through 18 are schematic diagrams that explain a procedure for installing a forty-eighth winding body in the method for assembling the winding assembly in the rotary electric machine according to Embodiment 1 of the present invention.

First, winding bodies 22 are produced by winding conductor wires 19 for four turns into a helical shape. Here, to facilitate explanation, the winding bodies 22 are designated winding body $22_1$, winding body $22_2$, winding body $22_3$, etc., through winding body $22_{47}$, and winding body $22_{48}$ in order of mounting.

Figure 10:
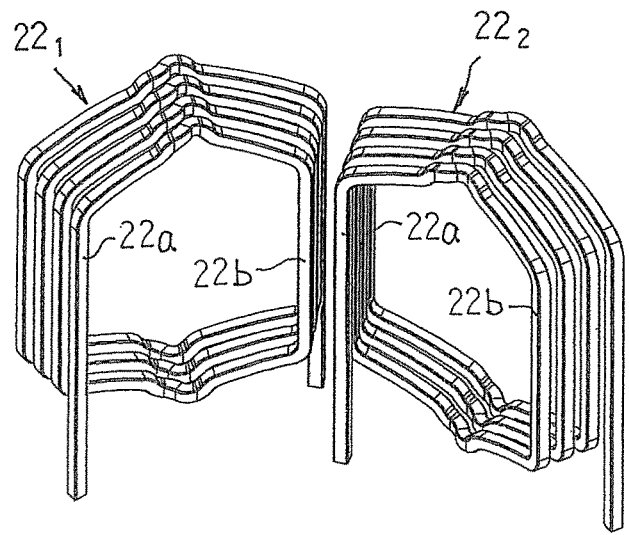
FIG. 10 is an oblique projection that explains a method for assembling a winding assembly in the rotary electric machine according to Embodiment 1 of the present invention.
Figure 11:
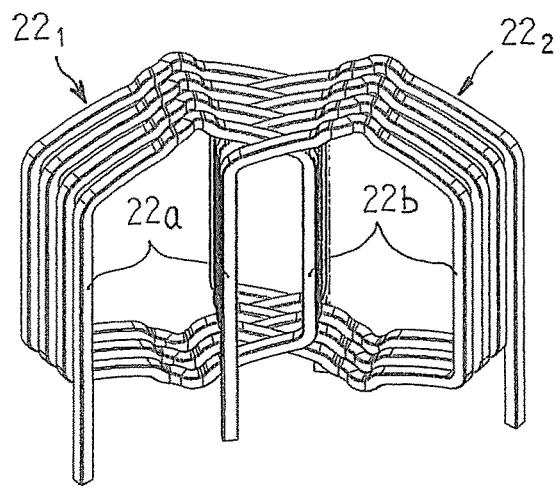
FIG. 11 is an oblique projection that explains the method for assembling a winding assembly in the rotary electric machine according to Embodiment 1 of the present invention.
Figure 12:
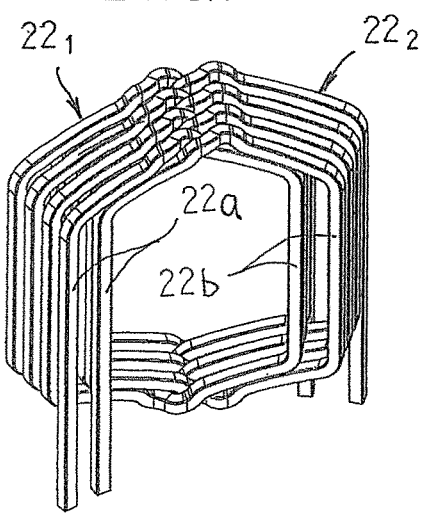
FIG. 12 is an oblique projection that explains the method for assembling a winding assembly in the rotary electric machine according to Embodiment 1 of the present invention.

Then, as shown in FIG. 10, the first and second winding bodies $22_1$ and $22_2$ are placed circumferentially adjacent to each other so as to align axial height positions. Next, as shown in FIG. 11, the first rectilinear portions 22a of the second winding body $22_2$ are inserted between the second rectilinear portions 22b of the first winding body $22_1$, which have a gap d. Next, the second winding body $22_2$ is moved circumferentially until the first rectilinear portions 22a of the second winding body $22_2$ are at a position that is separated by a pitch of one slot (the angle between the slots) from the first rectilinear portions 22a of the first winding body $22_1$. The two winding bodies $22_1$ and $22_2$ are thereby assembled as shown in FIG. 12. In the assemblage of the two winding bodies $22_1$ and $22_2$, the conductor wire 19 of the winding body $22_2$ enters the gaps between the conductor wire 19 of the winding body $22_1$, overlapping with each other radially and increasing rigidity.

Figure 13:
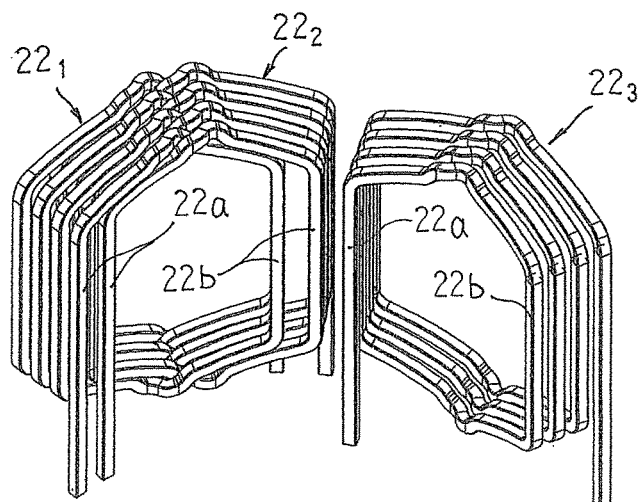
FIG. 13 is an oblique projection that explains the method for assembling a winding assembly in the rotary electric machine according to Embodiment 1 of the present invention.

Next, as shown in FIG. 13, the third winding body $22_3$ is placed circumferentially adjacent to the assemblage of the two winding bodies $22_1$ and $22_2$ so as to align axial height positions. Next, as shown in FIG. 14, the first rectilinear portions 22a of the third winding body $22_3$ are inserted between the second rectilinear portions 22b of the winding bodies $22_1$ and $22_2$. Next, the third winding body $22_3$ is moved circumferentially until the first rectilinear portions 22a of the third winding body $22_3$ are at a position that is separated by a pitch of one slot from the first rectilinear portions 22a of the second winding body $22_2$. Three winding bodies $22_1$, $22_2$, and $22_3$ are thereby assembled as shown in FIG. 15.

Winding bodies 22 are additionally mounted sequentially by aligning axial height positions and moving them circumferentially until the forty-seventh winding body $22_{47}$. As shown in FIG. 16, the assemblage 23 in which the forty-seven winding bodies $22_1$ through $22_{47}$ are assembled is increased in diameter to form a C shape that is wider than a circumferential width of the forty-eighth winding body $22_{48}$ between the first winding body $22_1$ and the forty-seventh winding body $22_{47}$.

Next, as shown in FIG. 17, the forty-eighth winding body $22_{48}$ is mounted onto an end near the forty-seventh winding body $22_{47}$. In addition, as shown in FIG. 18, an opening of the C-shaped assemblage 23 is closed, and the first winding body $22_1$ and the forty-eighth winding body $22_{48}$ are fitted together, to assemble the annular winding assembly 21 that is shown in FIG. 5.

In the winding assembly 21 that is assembled in this manner, forty-eight columns of eight first and second rectilinear portions 22a and 22b that are lined up in a single column radially are arranged circumferentially at a pitch of one slot. The eight first and second rectilinear portions 22a and 22b in each column are configured such that the first rectilinear portions 22a of one winding body 22 and the second rectilinear portions 22b of another winding body 22 line up alternately.

Figure 19:
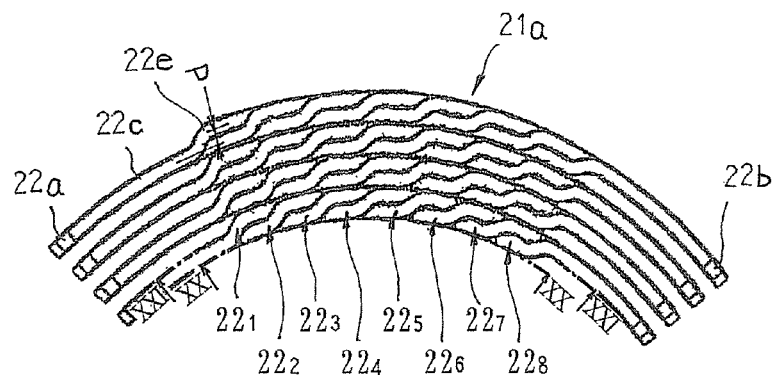
FIG. 19 is an end elevation of the winding assembly in the rotary electric machine according to Embodiment 1 of the present invention when viewed from a side near a first axial end.
Figure 20:
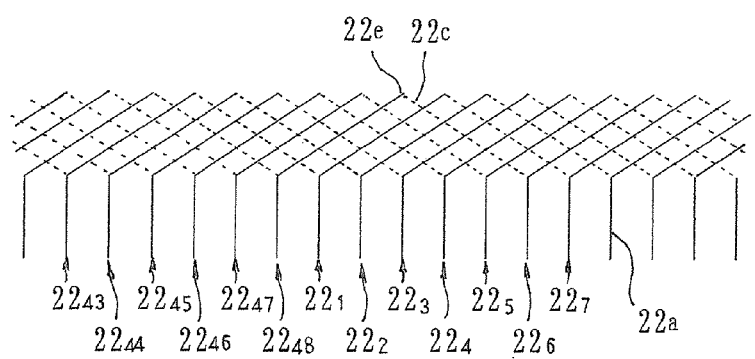
FIG. 20 is a developed projection of a cross section that is taken along Line XX-XX in FIG. 19.
Figure 21:
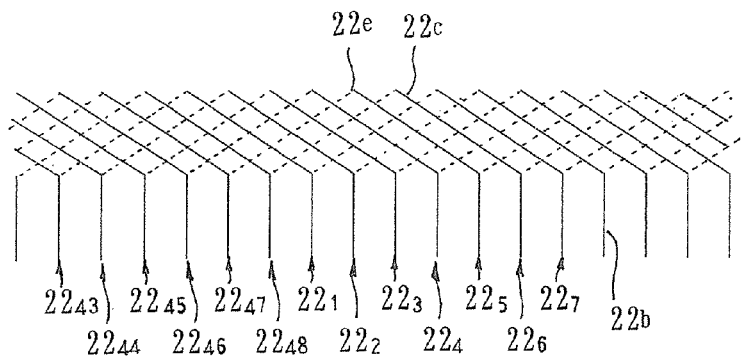
FIG. 21 is a developed projection of a cross section that is taken along Line XXI-XXI in FIG. 19.

Next, construction of coil end groups of the winding assembly 21 will be explained. FIG. 19 is an end elevation of the winding assembly in the rotary electric machine according to Embodiment 1 of the present invention when viewed from a side near a first axial end, FIG. 20 is a developed projection of a cross section that is taken along Line XX-XX in FIG. 19, and FIG. 21 is a developed projection of a cross section that is taken along Line XXI-XXI in FIG. 19. Moreover, to facilitate explanation, FIG. 19 shows eight circumferentially consecutive winding bodies $22_1$ through $22_8$ in isolation. In FIG. 20, conductor wires 19 that are positioned first from radially inside are represented by solid lines, and conductor wires 19 that are positioned second from radially inside are represented by broken lines. In FIG. 21, conductor wires 19 that are positioned second from radially inside are represented by solid lines, and conductor wires 19 that are positioned third from radially inside are represented by broken lines.

Focusing on the winding body $22_2$ in FIG. 19, first coil ends 22c that extend outward from the first rectilinear portions 22a of the winding body $22_2$ extend circumferentially so as to pass under the first coil ends 22c that extend outward from the first rectilinear portions 22a of the winding body $22_1$ on the left, emerge immediately before reaching the first top portions 22e, shift at the first top portions 22e radially outward so as to leave a gap d, extend circumferentially so as to pass over the first coil ends 22c of the winding body $22_1$ on the left, and are connected to second rectilinear portions 22b.

Thus, at a first axial end of the winding assembly 21, first coil end rows that are configured by arranging the first coil ends 22c in single rows circumferentially at a pitch of one slot are lined up in four layers in a radial direction to constitute a first coil end group 21a. Within the first coil end rows, a set insulating distance is ensured between circumferentially adjacent first coil ends 22c.

Focusing on the winding body $22_2$ in FIG. 20, inclined portions of the first coil ends 22c that extend outward to the first top portions 22e from the first rectilinear portions 22a that are positioned first from radially inside intersect with inclined portions of the first coil ends 22c that extend outward to the first top portions 22e from the second rectilinear portions 22b (not shown) of the five winding bodies $22_{45}$ through $22_1$ that are positioned second from radially inside. Thus, conductor wires 19 of different phases are disposed in close proximity to each other in a radial direction within the first coil end rows.

Focusing on the winding body $22_2$ in FIG. 21, inclined portions of the first coil ends 22c that extend outward to the first top portions 22e from the second rectilinear portions 22b that are positioned second from radially inside intersect with inclined portions of the first coil ends 22c that extend outward to the first top portions 22e from the first rectilinear portions 22a (not shown) of the five winding bodies $22_2$ through $22_7$ that are positioned third from radially inside. Thus, conductor wires 19 of different phases are disposed in close proximity to each other in a radial direction between the first coil end rows.

At a second axial end of the winding assembly 21, second coil end rows that are configured by arranging the second coil ends 22d in single rows circumferentially at a pitch of one slot are lined up in three layers in a radial direction to constitute a second coil end group 21b. The winding ends 22g each project axially outward, and are arranged on a radially inner side of the second coil end group 21b. The winding ends 22h each project axially outward, and are arranged on a radially outer side of the second coil end group 21b. Conductor wires 19 of different phases are also disposed in close proximity to each other in a radial direction within the second coil end rows. Conductor wires 19 of different phases are also disposed in close proximity to each other in a radial direction between the second coil end rows.

Figure 22:
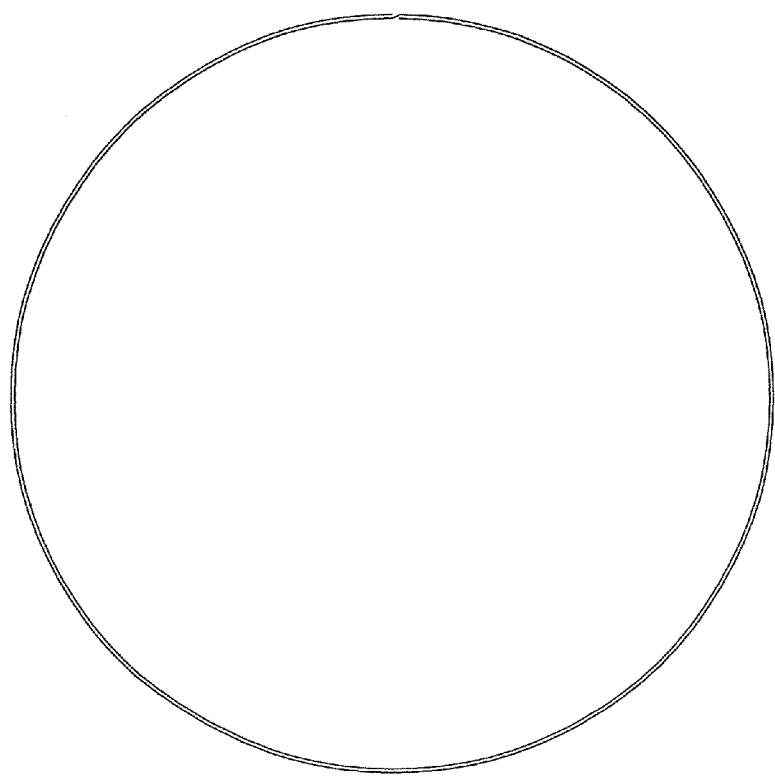
FIG. 22 is a top plan that shows an insulating paper that is mounted to the winding assembly in the rotary electric machine according to Embodiment 1 of the present invention.
Figure 23:
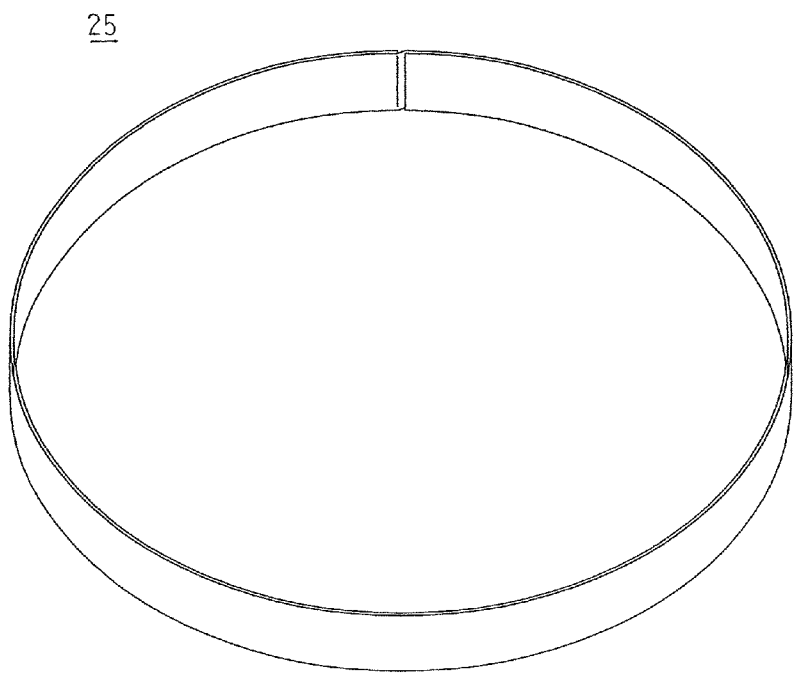
FIG. 23 is an oblique projection that shows the insulating paper that is mounted to the winding assembly in the rotary electric machine according to Embodiment 1 of the present invention.
Figure 24:
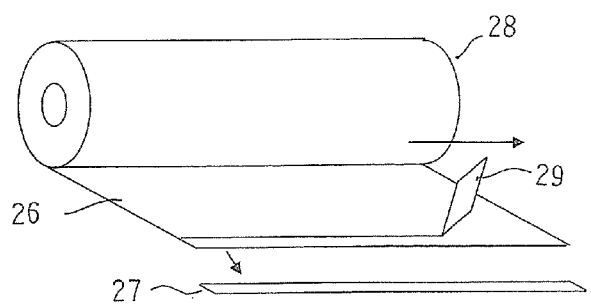
FIG. 24 is an oblique projection that explains a method for manufacturing the insulating paper that is mounted to the winding assembly in the rotary electric machine according to Embodiment 1 of the present invention.
Figure 25:
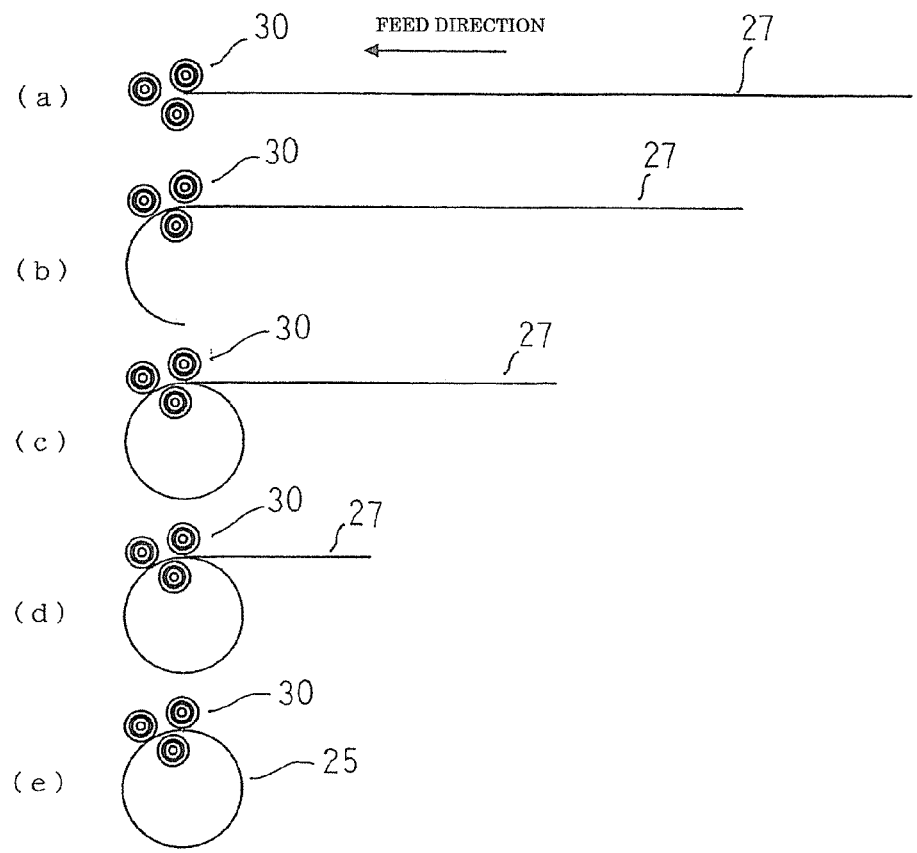
FIG. 25 is a process diagram that explains the method for manufacturing the insulating paper that is mounted to the winding assembly in the rotary electric machine according to Embodiment 1 of the present invention.
Figure 26:
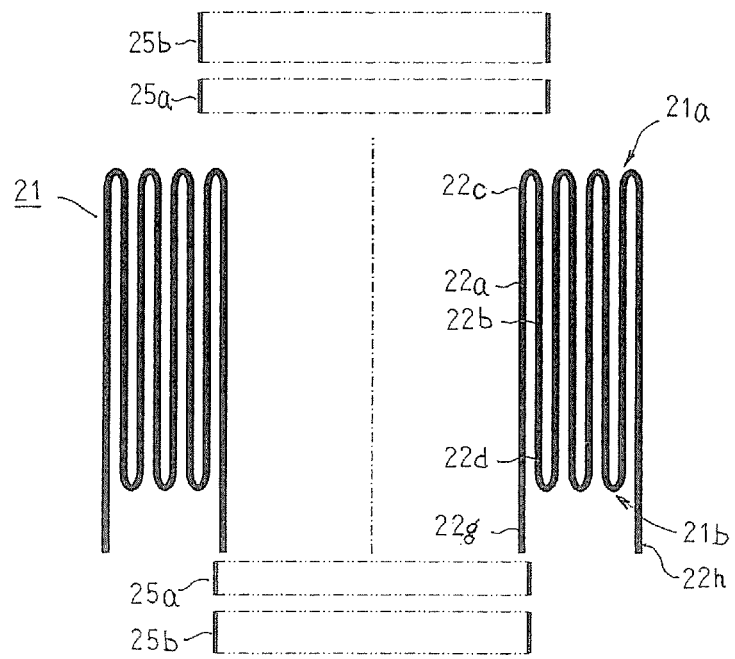
FIG. 26 is a schematic diagram that explains a method for mounting insulating papers to the winding assembly in the rotary electric machine according to Embodiment 1 of the present invention.
Figure 27:
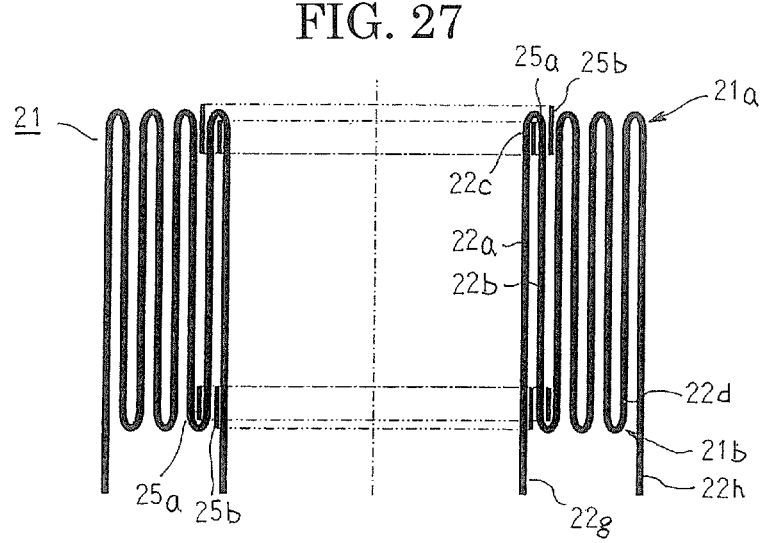
FIG. 27 is a schematic diagram that explains the method for mounting insulating papers to the winding assembly in the rotary electric machine according to Embodiment 1 of the present invention.
Figure 28:
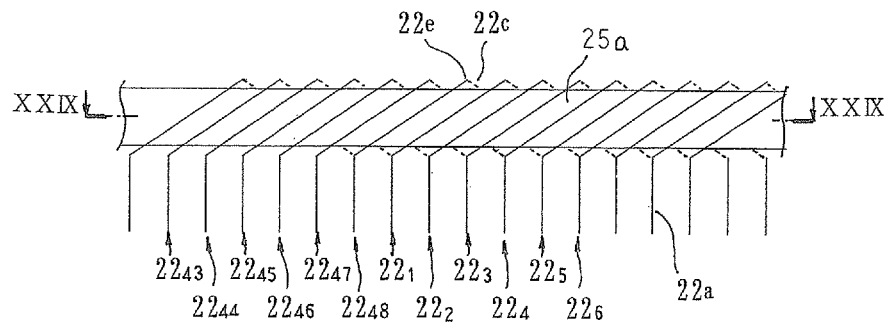
FIG. 28 is a developed projection that shows a mounted state of an insulating paper in the winding assembly in the rotary electric machine according to Embodiment 1 of the present invention.
Figure 29:
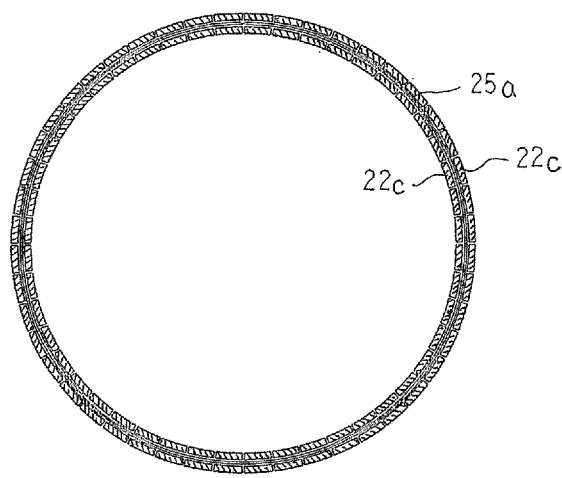
FIG. 29 is a cross section that is taken along Line XXIX-XXIX in FIG. 28 so as to be viewed in the direction of the arrows.
Figure 30:
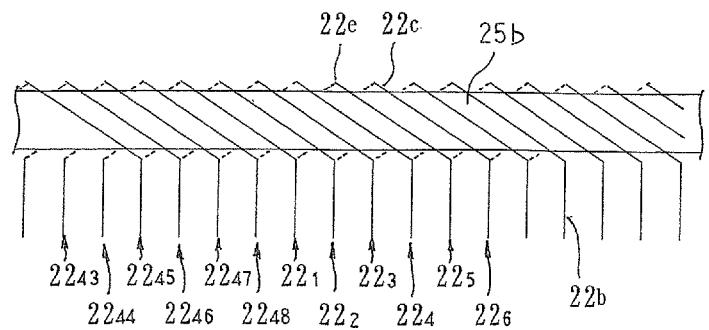
FIG. 30 is a developed projection that shows a mounted state of an insulating paper in the winding assembly in the rotary electric machine according to Embodiment 1 of the present invention.

Next, a method for mounting the insulating papers 25 to the winding assembly 21 will be explained with reference to FIGS. 22 through 30. FIG. 22 is a top plan that shows an insulating paper that is mounted to the winding assembly in the rotary electric machine according to Embodiment 1 of the present invention, FIG. 23 is an oblique projection that shows the insulating paper that is mounted to the winding assembly in the rotary electric machine according to Embodiment 1 of the present invention, FIG. 24 is an oblique projection that explains a method for manufacturing the insulating paper that is mounted to the winding assembly in the rotary electric machine according to Embodiment 1 of the present invention, FIG. 25 is a process diagram that explains the method for manufacturing the insulating paper that is mounted to the winding assembly in the rotary electric machine according to Embodiment 1 of the present invention, FIGS. 26 and 27 are schematic diagrams that explain a method for mounting insulating papers to the winding assembly in the rotary electric machine according to Embodiment 1 of the present invention, FIG. 28 is a developed projection that shows a mounted state of an insulating paper in the winding assembly in the rotary electric machine according to Embodiment 1 of the present invention, FIG. 29 is a cross section that is taken along Line XXIX-XXIX in FIG. 28 so as to be viewed in the direction of the arrows, and FIG. 30 is a developed projection that shows a mounted state of an insulating paper in the winding assembly in the rotary electric machine according to Embodiment 1 of the present invention. Moreover, FIG. 28 corresponds to FIG. 20, and FIG. 30 corresponds to FIG. 21.

As shown in FIGS. 22 and 23, the insulating paper 25 is formed by rolling into a cylindrical shape a rectilinear insulating material 27 that functions as a strip-shaped body that is cut from an insulating sheet 26 that is made of a polyimide, an aramid, polyethylene terephthalate (PET); or polyphenylene sulfide (PPS), for example, that is formed into a single layer or multiple layers. This insulating paper 25 is configured into a closed-ring cylindrical shape that has uniform thickness in a circumferential direction by winding the rectilinear insulating material 27 for a little less than two laps such that the two longitudinal ends of the rectilinear insulating material 27 do not overlap radially.

As shown in FIG. 24, the rectilinear insulating material 27 is cut using a cutter 29 to a set width from an insulating sheet 26 that is fed from a roll body 28. A longitudinal direction of the rectilinear insulating material 27 that is cut in this manner is a direction that is perpendicular to a feed direction from the roll body 28. Next, the rectilinear insulating material 27 is conveyed to a roller 30, as shown in FIG. 25(a). Then the cylindrical insulating paper 25 is produced by winding the rectilinear insulating material 27 for a little less than the two laps using the roller 30, as shown in FIG. 25(b) through 25(e). Moreover, the insulating papers 25 are constituted by narrow-width first insulating papers 25a and broad-width second insulating papers 25b.

Next, as shown in FIG. 26, first insulating papers 25a and second insulating papers 25b are disposed at the second axial end of the winding assembly 21 between a second coil end row that is first from a radially inner side of the second coil end group 21b and the row of winding ends 22g. Similarly, first insulating papers 25a and second insulating papers 25b are disposed at the first axial end of the winding assembly 21 between a first coil end row that is first from a radially inner side of the first coil end group 21a and a first coil end row that is second.

Next, the insulating paper 25a that is disposed near the second axial end of the winding assembly 21 is moved toward the first axial end. The insulating paper 25a passes between the second coil end row that is first from the radially inner side of the second coil end group 21b and the row of winding ends 22g, passes between the row of first rectilinear portions 22a that are arranged at a pitch of one slot circumferentially at the first position from the radially inner side and the row of second rectilinear portions 22b that are arranged at a pitch of one slot circumferentially at the second position from the radially inner side, and is moved toward the first axial end of the winding assembly 21. Then, as shown in FIG. 27, the insulating paper 25a is disposed inside the first coil end row that is first from the radially inner side of the first coil end group 21a. As shown in FIGS. 28 and 29, the insulating paper 25a that is disposed inside the first coil end row is thereby disposed between the intersecting inclined portions of the first coil ends 22c in the first coil end row, ensuring insulating distance between the conductor wires 19 in different phases.

In addition, an insulating paper 25b is inserted between the second coil end row that is first from the radially inner side of the second coil end group 21b and the row of winding ends 22g from near the second axial end of the winding assembly 21. As shown in FIG. 27, the insulating paper 25b is thereby disposed between the second coil end row that is first from the radially inner side and the row of winding ends 22g, ensuring insulating distance between the conductor wires 19 in different phases.

Next, the insulating paper 25a that is disposed near the first axial end of the winding assembly 21 is moved toward the second axial end. The insulating paper 25a passes between the first coil end row that is first from the radially inner side of the first coil end group 21a and the first coil end row that is second, passes between the row of second rectilinear portions 22b that are arranged at a pitch of one slot circumferentially at the second position from the radially inner side and the row of first rectilinear portions 22a that are arranged at a pitch of one slot circumferentially at the third position from the radially inner side, and is moved toward the second axial end of the winding assembly 21. Then, as shown in FIG. 27, the insulating paper 25a is disposed inside the second coil end row that is first from the radially inner side of the second coil end group 21b. The insulating paper 25a that is disposed inside the second coil end row is thereby disposed between the intersecting inclined portions of the second coil ends 22d in the second coil end row, ensuring insulating distance between the conductor wires 19 in different phases.

In addition, an insulating paper 25b is inserted between the first coil end row that is first from the radially inner side of the first coil end group 21a and the first coil end row that is second from near the first axial end of the winding assembly 21. As shown in FIG. 30, the insulating paper 25b is thereby disposed between the first coil end row that is first from the radially inner side and the first coil end row that is second, and is disposed between the inclined portions of the first coil end 22c that intersect between the first coil end rows that are first and second from the radially inner side, ensuring insulating distance between the conductor wires 19 in different phases.

Similarly, insulating papers 25a are disposed inside the first coil end rows that are second, third, and fourth from the radially inner side of the first coil end group. Insulating papers 25b are also disposed between the first coil end rows that are second and third from the radially inner side of the first coil end group, and between the first coil end rows that are third and fourth from the radially inner side. In addition, insulating papers 25a are disposed inside the second coil end rows that are second and third from the radially inner side of the second coil end group. Insulating papers 25b are also disposed between the second coil end rows that are first and second from the radially inner side of the second coil end group, between the second coil end rows that are second and third from the radially inner side, and between the second coil end row that is third from the radially inner side and the row of winding ends 22h.

Figure 31:
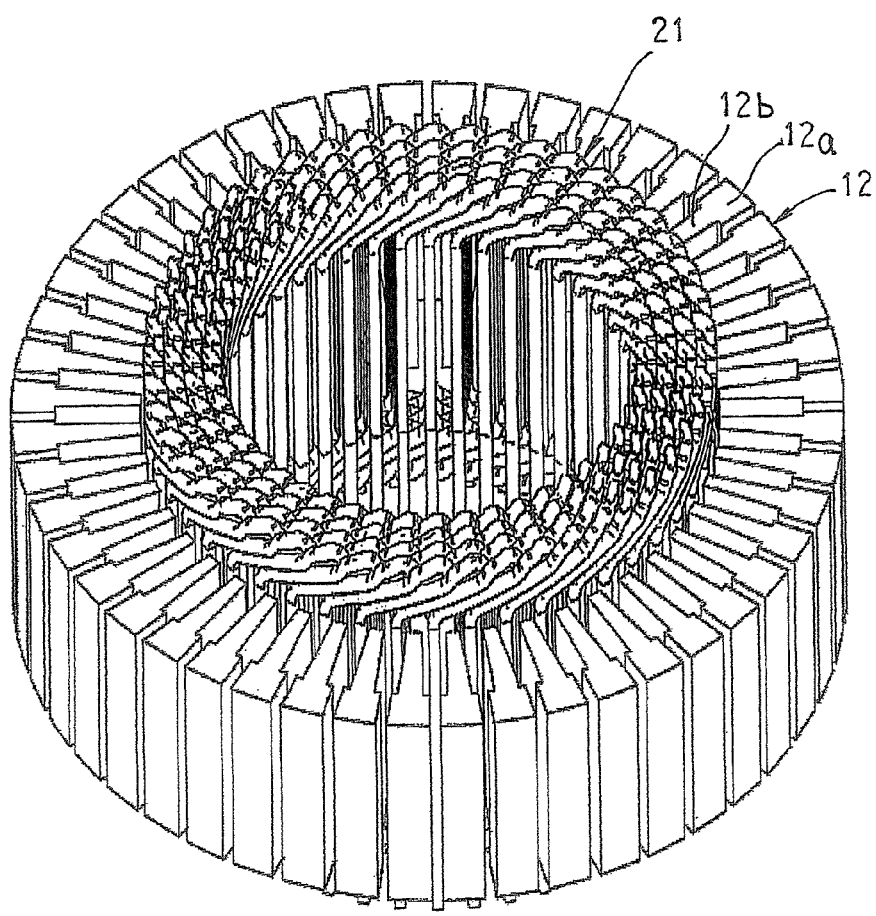
FIG. 31 is an oblique projection that shows a state before mounting the winding assembly to the armature core in the rotary electric machine according to Embodiment 1 of the present invention.
Figure 32:
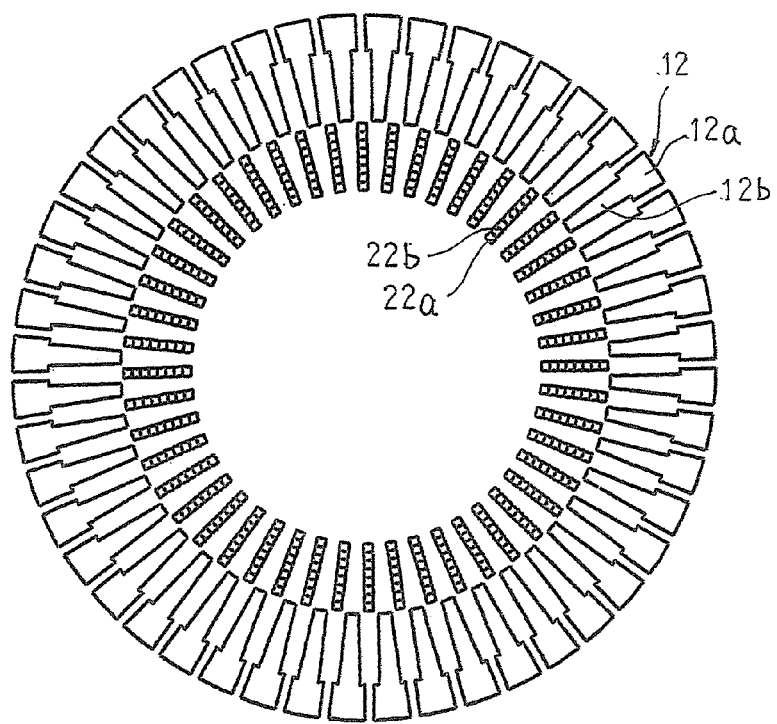
FIG. 32 is an end elevation that shows the state before mounting the winding assembly to the armature core in the rotary electric machine according to Embodiment 1 of the present invention.
Figure 33:
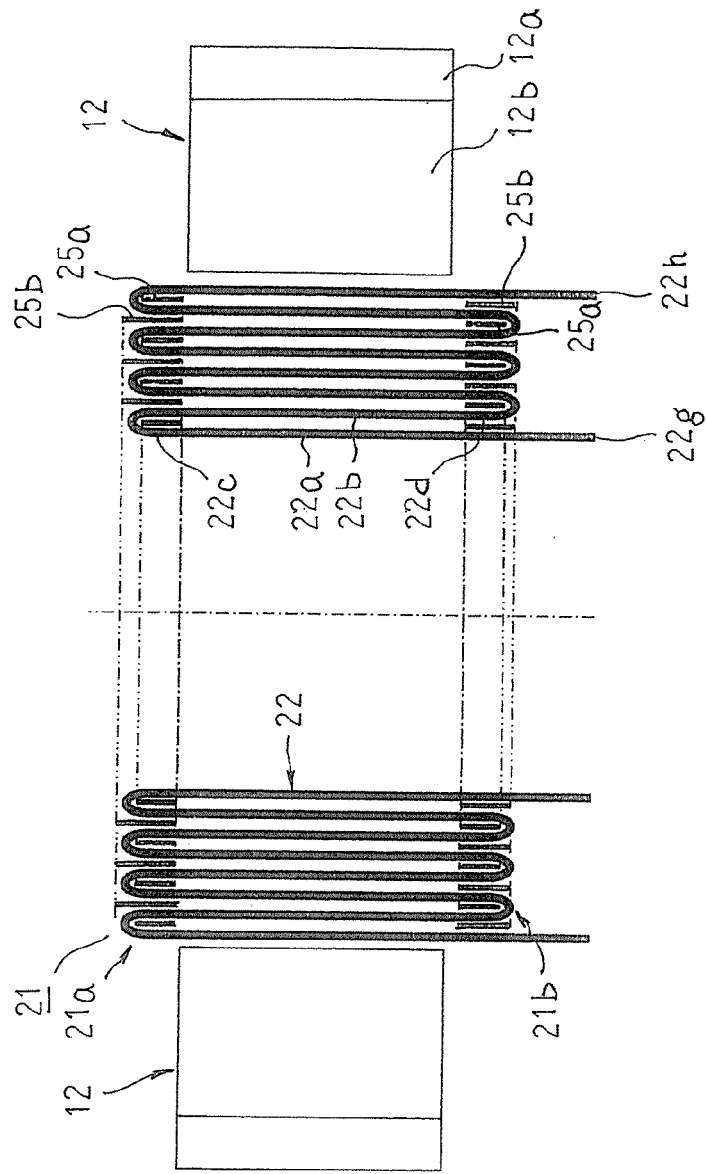
FIG. 33 is a schematic diagram that shows the state before mounting the winding assembly to the armature core in the rotary electric machine according to Embodiment 1 of the present invention.
Figure 34:
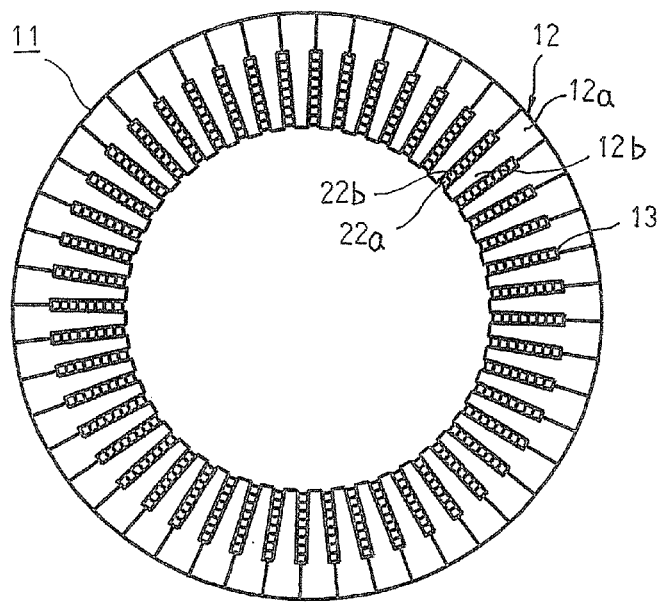
FIG. 34 is an end elevation that shows a state after mounting the winding assembly to the armature core in the rotary electric machine according to Embodiment 1 of the present invention.
Figure 35:
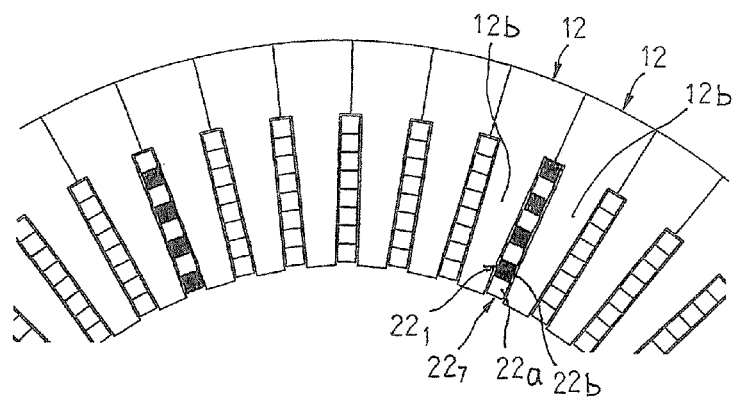
FIG. 35 is a partially enlarged end elevation that shows the state after mounting the winding assembly to the armature core in the rotary electric machine according to Embodiment 1 of the present invention.
Figure 36:
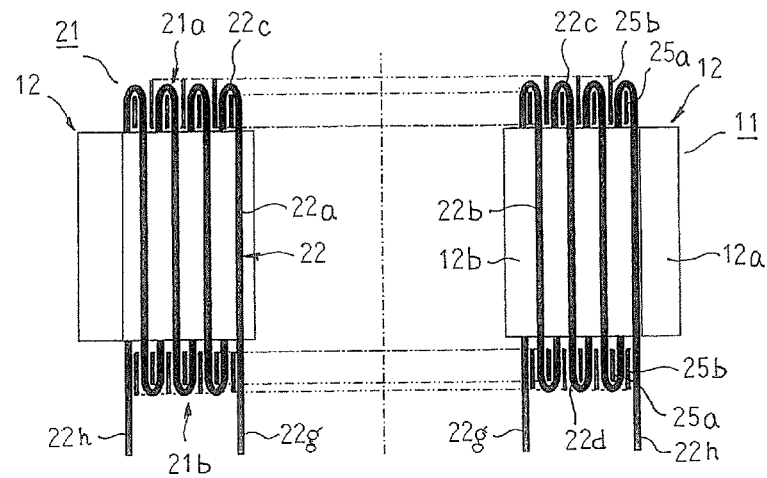
FIG. 36 is a schematic diagram that shows the state after mounting the winding assembly to the armature core in the rotary electric machine according to Embodiment 1 of the present invention.

Next, a method for mounting the winding assembly 21 to the armature core 11 will be explained with reference to FIGS. 31 through 36. FIG. 31 is an oblique projection that shows a state before mounting the winding assembly to the armature core in the rotary electric machine according to Embodiment 1 of the present invention, FIG. 32 is an end elevation that shows the state before mounting the winding assembly to the armature core in the rotary electric machine according to Embodiment 1 of the present invention, FIG. 33 is a schematic diagram that shows the state before mounting the winding assembly to the armature core in the rotary electric machine according to Embodiment 1 of the present invention, FIG. 34 is an end elevation that shows a state after mounting the winding assembly to the armature core in the rotary electric machine according to Embodiment 1 of the present invention, FIG. 35 is a partially enlarged end elevation that shows the state after mounting the winding assembly to the armature core in the rotary electric machine according to Embodiment 1 of the present invention, and FIG. 36 is a schematic diagram that shows the state after mounting the winding assembly to the armature core in the rotary electric machine according to Embodiment 1 of the present invention. Moreover, for simplicity, only the first and second rectilinear portions 22a and 22b of the winding assembly 21 are shown in FIGS. 32, 34, and 35. Insulating papers are also omitted from FIG. 31 for simplicity.

First, each of the winding bodies 22 of the winding assembly 21 is moved slightly radially outward to make an outside diameter of the winding assembly 21 greater than a final outside diameter (the outside diameter of the winding assembly 21 when installed in the armature core 11). Spacing between the columns of the first and second rectilinear portions 22a and 22b is widened thereby.

Next, forty-eight core blocks 12 are arranged at an approximately uniform angular pitch circumferentially such that respective teeth are positioned on a radially outer side between adjacent columns of first and second rectilinear portions 22a and 22b of the winding assembly 21, as shown in FIGS. 31 through 33. Next, the core blocks 12 that are arranged circumferentially are simultaneously moved radially inward. The respective teeth 12b of the core blocks 12 are thereby inserted between the adjacent columns of first and second rectilinear portions 22a and 22b.

Then, when the core blocks 12 that are arranged in a row circumferentially are moved further radially inward, the first and second rectilinear portions 22a and 22b in each column are moved by the tapered teeth 12b so as to line up in a single column. The winding assembly 21 is thereby reduced in diameter, and the second rectilinear portions 22b that are positioned on the outermost radius of the winding assembly 21 come into contact with the core back portions 12a of the adjacent core blocks 12. In addition, when the core blocks 12 that are arranged in a row circumferentially are moved further radially inward, the circumferential side surfaces of the adjacent core blocks 12 are abutted with each other, preventing radially inward movement of the core blocks 12. The forty-eight core blocks 12 are arranged into an annular shape by abutting together the circumferential side surfaces of the core back portions 12a to constitute the armature core 11.

The winding assembly 21 is thereby mounted to the annular armature core 11, as shown in FIGS. 34 through 36. Specifically, the forty-eight winding bodies 22 are arranged circumferentially at a pitch of one slot such that four first rectilinear portions 22a and four second rectilinear portions 22b are housed in respective pairs of slots 13 that are positioned on two sides of six circumferentially consecutive teeth 12b. Inside each of the slots 13, eight first and second rectilinear portions 22a and 22b are housed such that the long sides of the rectangular cross sections are oriented circumferentially so as to line up neatly in a single column in a radial direction.

Moreover, although not shown, set alternating-current connections are applied to the winding assembly 21 that is mounted to the armature core 11, to configure the armature winding 20. The armature winding 20 that is configured in this manner constitutes a full-pitch distributed three-phase alternating-current winding. A rotary electric machine 100 that uses this armature winding 20 operates as an eight-pole forty-eight-slot inner-rotor three-phase motor when set alternating-current power is supplied to the armature winding 20.

According to Embodiment 1, cylindrical first and second insulating papers 25a and 25b are disposed inside first coil end rows that constitute a first coil end group 21a, and between radially adjacent first coil end rows. Cylindrical first and second insulating papers 25a and 25b are also disposed inside second coil end rows that constitute a second coil end group 21b, and between radially adjacent second coil end rows. Thus, sufficient interphase insulation performance can be ensured in the first and second coil end groups 21a and 21b without changing the thickness or material of the insulating coating between the first and second rectilinear portions 22a and 22b and the first and second coil ends 22c and 22d. Consequently, a rotary electric machine 100 that can achieve high voltage and high output as well as size reductions can be achieved simply.

The first and second insulating papers 25a and 25b are produced by winding the rectilinear insulating material 27 for a little less than two laps such that the two longitudinal ends of the rectilinear insulating material 27 do not overlap radially. Thus, the first and second insulating papers 25a and 25b can be configured into closed-ring cylindrical shapes that have uniform thickness in the circumferential direction, enabling sufficient insulation performance to be ensured in intersecting portions of the first and second coil ends 22c and 22d.

Now, if the number of turns of the rectilinear insulating material 27 is one lap, a cut line is formed between the two longitudinal ends of the rectilinear insulating material 27, making partial discharges more likely to occur. Alternatively, if the two longitudinal ends of the rectilinear insulating material 27 overlap radially, uniform thickness in the circumferential direction cannot be achieved. Thus, it is preferable to make the number of turns of the rectilinear insulating material 27 a little less than a plurality of laps. Since the length of the rectilinear insulating material 27 is increased, if the number of turns of the rectilinear insulating material 27 is increased, and it is necessary to prepare a broad-width roll body 28, and the thickness of the rectilinear insulating material 27 is also reduced, diminishing the rigidity of the first and second insulating papers 25a and 25b, it is particularly preferable to make the number of turns of the rectilinear insulating material 27 a little less than two laps. Moreover, "a little less than a plurality of laps" means making the two longitudinal ends of the rectilinear insulating material 27 slightly less than a plurality of laps so as not to overlap with each other radially.

The rectilinear insulating material 27 is cut out of an insulating sheet 26 that is fed from a roll body 28 to a set width using a cutter 29. Thus, a direction in which the rectilinear insulating material 27 is wound into a cylindrical shape is different than a direction in which the rectilinear insulating material 27 is wound onto the roll body 28, facilitating a step of winding the rectilinear insulating material 27. Furthermore, rectilinear insulating materials 27 that correspond to the first and second insulating papers 25a and 25b, which have different widths, can be produced by adjusting the width that is cut out of the insulating sheet 26, enabling material yield to be improved.

The winding bodies 22 are four-turn hexagonal coils, and include: first and second rectilinear portions 22a and 22b that are arranged in two columns such that four line up in each of the columns; first coil ends 22c that link together respective first longitudinal ends of the first and second rectilinear portions 22a and 22b; and second coil ends 22d that link together respective second longitudinal ends of the first and second rectilinear portions 22a and 22b. The first and second coil ends 22c and 22d are configured so as to be shifted at first and second top portions 22e and 22f in a radial direction so as to leave gaps d that are approximately equal to radial dimensions of the first and second rectilinear portions 22a and 22b. Thus, one winding body 22 can be mounted to another winding body 22 without interference by aligning the axial height positions and moving it toward the other winding body 22 circumferentially, enabling assembly of the winding assembly 21 to be improved.

Rectilinear portion columns of the winding assembly 21 that are configured by arranging the eight first and second rectilinear portions 22a and 22b of two winding bodies 22 alternately in single columns radially are arranged at a pitch of one slot circumferentially. First coil end rows that are configured by arranging the first coil ends 22c at a pitch of one slot circumferentially are arranged in four layers radially. In addition, second coil end rows that are configured by arranging the second coil ends 22d at a pitch of one slot circumferentially are arranged in three layers radially. Thus, the cylindrical first insulating papers 25a can be inserted between the second coil end rows from the second axial end of the winding assembly 21, and passed between radially adjacent first and second rectilinear portions 22a and 22b and moved toward the first axial end, to be housed inside the first coil end rows. Similarly, the cylindrical first insulating papers 25a can be inserted between the first coil end rows from the first axial end of the winding assembly 21, and passed between radially adjacent first and second rectilinear portions 22a and 22b and moved toward the second axial end, to be housed inside the second coil end rows.

Consequently, it is not necessary to change the thicknesses or material of the insulating coatings between the first and second rectilinear portions 22a and 22b and the first and second coil ends 22c and 22d, enabling a step of insulating treatment of the first and second coil end groups 21a and 21b to be simplified.

Because the armature 10 is assembled by assembling a winding assembly 21 by arranging forty-eight winding bodies 22 at a pitch of one slot circumferentially, and by inserting teeth 12b of core blocks 12 between columns of first and second rectilinear portions 22a and 22b from a radially outer side of the winding assembly 21, the hexagonal winding bodies 22 can easily be mounted into the annular armature core so as to be arranged circumferentially at a pitch of one slot.

Tapered teeth 12b are inserted between each of the columns of first and second rectilinear portions 22a and 22b from radially outside and moved radially inward. Thus, the first and second rectilinear portions 22a and 22b that are lined up irregularly in the radial direction are arranged neatly in a single column by the movement that narrows the spacing between the teeth 12b of the adjacent core blocks 12.

In addition, after the second rectilinear portions 22b that are positioned on the outermost radius of the winding assembly 21 come into contact with the core back portions 12a of the adjacent core blocks 12, the motive force of the core blocks 12 acts so as to push the second rectilinear portions 22b that are positioned on the outermost radius radially inward until the side surfaces of the core back portions 12a of the adjacent core blocks 12 are abutted with each other. The winding assembly 21 is thereby reduced in diameter, reducing or eliminating gaps between each of the first and second rectilinear portions 22a and 22b that are arranged neatly in a column in the radial direction by the radially inward movement of the core back portions 12a of the core blocks 12. Thus, the first and second rectilinear portions 22a and 22b are housed inside the slots 13 at a high density, increasing the space factor of the conductor wires 19.

The conductor wires 19 inside the slots 13 and the core blocks 12 are in contact with each other, and heat transfer performance from the winding assembly 21, which constitutes a heat-generating body during passage of electric current, to the armature core 11 can be improved. Thus, temperature increases in the winding assembly 21 are suppressed, suppressing increases in electrical resistance.

Because the core blocks 12 are inserted such that the spacing between the adjacent teeth 12b becomes gradually narrower, sliding movement at contact surfaces between the armature winding 20 and the core blocks 12 is suppressed, enabling damage to insulating coatings of the conductor wires 19 to be prevented.

Moreover, in Embodiment 1 above, a sheet that is made of a polyimide, an aramid, polyethylene terephthalate (PET), or polyphenylene sulfide (PPS), etc., is used to produce the first and second insulating papers, but the first and second insulating papers may be produced using a prepreg in which a matrix resin such as an epoxy resin, etc., is impregnated into carbon fiber. In that case, the winding assembly can be integrated in a shaped state by mounting the first and second insulating papers to the coil end groups of the winding assembly, shaping the winding assembly, and then heating and curing the matrix resin.

In Embodiment 1 above, the second insulating papers are mounted between the coil end rows before mounting the winding assembly to the armature core, but the second insulating papers may be mounted between the coil end rows after the winding assembly is mounted to the armature core.

Embodiment 2

Figure 37:
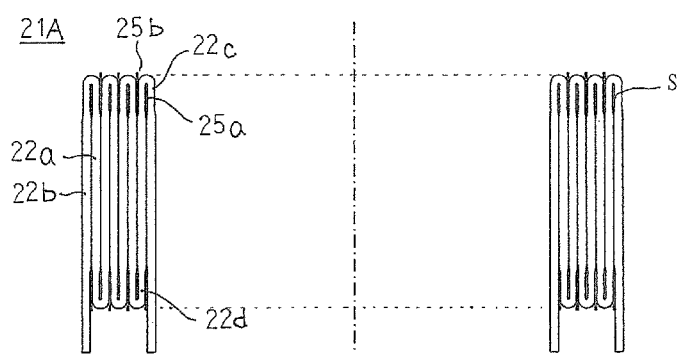
FIG. 37 is a schematic diagram that shows a state in which a winding assembly that is used in a rotary electric machine according to Embodiment 2 of the present invention is cut in a plane that includes a rotating shaft.

FIG. 37 is a schematic diagram that shows a state in which a winding assembly that is used in a rotary electric machine according to Embodiment 2 of the present invention is cut in a plane that includes a rotating shaft.

In FIG. 37, a winding assembly 21A is formed such that radial thicknesses of first and second coil ends 22c and 22d are thinner than radial thicknesses of first and second rectilinear portions 22a and 22b by an amount proportionate to thicknesses of first and second insulating papers 25a and 25b.

Moreover, the rest of the configuration is formed in a similar or identical manner to that of Embodiment 1 above.

According to Embodiment 2, radial thicknesses of first and second coil ends 22c and 22d are formed so as to be thinner than radial thicknesses of first and second rectilinear portions 22a and 22b by an amount proportionate to thicknesses of first and second insulating papers 25a and 25b. Thus, gaps S that correspond to amounts proportionate to the thicknesses of the first and second insulating papers 25a and 25b are formed inside the first coil end rows and between intersecting portions of the first and second coil ends 22c and 22d between the first coil end rows. Similarly, gaps S that correspond to amounts proportionate to the thicknesses of the first and second insulating papers 25a and 25b are formed inside the second coil end rows and between intersecting portions of the first and second coil ends 22c and 22d between the second coil end rows.

Increases in radial dimensions of the first and second coil end groups 21a and 21b are thereby suppressed even if the first and second insulating papers 25a and 25b are disposed inside the first and second coil end rows and between the intersecting portions of the first and second coil ends 22c and 22d between the first and second coil end rows. Thus, the first and second rectilinear portions 22a and 22b are housed inside the slots 13 so as to line up in single columns in a radial direction without gaps, increasing space factor.

Embodiment 3

Figure 38:
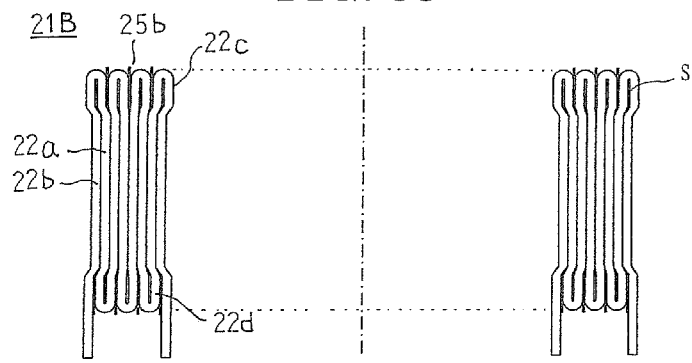
FIG. 38 is a schematic diagram that shows a state in which a winding assembly that is used in a rotary electric machine according to Embodiment 3 of the present invention is cut in a plane that includes a rotating shaft.

FIG. 38 is a schematic diagram that shows a state in which a winding assembly that is used in a rotary electric machine according to Embodiment 3 of the present invention is cut in a plane that includes a rotating shaft.

In FIG. 38, inclined portions that extend from second rectilinear portions 22b of first coil ends 22c that constitute a first coil end row that is second from a radially inner side to first top portions 22e are displaced radially inward relative to the second rectilinear portions 22b, and inclined portions that extend from first rectilinear portions 22a of first coil ends 22c that constitute a first coil end row that is third from the radially inner side to the first top portions 22e are displaced radially outward relative to the first rectilinear portions 22a, such that a gap S that corresponds to an amount proportionate to a thickness of a second insulating paper 25b is formed between intersecting portions of the first and second coil ends 22c and 22d between the first coil end rows that are second and third from the radially inner side.

Inclined portions that extend from first rectilinear portions 22a of first coil ends 22c that constitute a first coil end row that is second from the radially inner side to the first top portions 22e are displaced radially inward relative to the first rectilinear portions 22a, such that a gap S that corresponds to an amount proportionate to a thickness of a first insulating paper 25a is formed between intersecting portions of the first and second coil ends 22c and 22d inside the first coil end row that is second from the radially inner side.

Inclined portions that extend from second rectilinear portions 22b of first coil ends 22c that constitute a first coil end row that is first from the radially inner side to the first top portions 22e are displaced radially inward relative to the second rectilinear portions 22b, such that a gap S that corresponds to an amount proportionate to a thickness of a second insulating paper 25b is formed between intersecting portions of the first and second coil ends 22c and 22d between the first coil end rows that are first and second from the radially inner side.

Inclined portions that extend from first rectilinear portions 22a of first coil ends 22c that constitute a first coil end row that is first from the radially inner side to the first top portions 22e are displaced radially inward relative to the first rectilinear portions 22a, such that a gap S that corresponds to an amount proportionate to a thickness of a first insulating paper 25a is formed between intersecting portions of the first and second coil ends 22c and 22d inside the first coil end row that is first from the radially inner side.

Inclined portions that extend from second rectilinear portions 22b of first coil ends 22c that constitute a first coil end row that is third from the radially inner side to the first top portions 22e are displaced radially outward relative to the second rectilinear portions 22b, such that a gap S that corresponds to an amount proportionate to a thickness of a first insulating paper 25a is formed between intersecting portions of the first and second coil ends 22c and 22d inside the first coil end row that is third from the radially inner side.

Inclined portions that extend from first rectilinear portions 22a of first coil ends 22c that constitute a first coil end row that is fourth from the radially inner side to the first top portions 22e are displaced radially outward relative to the first rectilinear portions 22a, such that a gap S that corresponds to an amount proportionate to a thickness of a second insulating paper 25b is formed between intersecting portions of the first and second coil ends 22c and 22d between the first coil end rows that are third and fourth from the radially inner side.

Inclined portions that extend from second rectilinear portions 22b of first coil ends 22c that constitute a first coil end row that is fourth from the radially inner side to the first top portions 22e are displaced radially inward relative to the second rectilinear portions 22b, such that a gap S that corresponds to an amount proportionate to a thickness of a first insulating paper 25a is formed between intersecting portions of the first and second coil ends 22c and 22d inside the first coil end row that is fourth from the radially inner side.

Moreover, radial thicknesses of the first and second coil ends 22c and 22d are equal to radial thicknesses of first and second rectilinear portions 22a and 22b.

In a winding assembly 22B that is configured in this manner, the first and second rectilinear portions 22a and 22b are housed inside the slots 13 so as to be arranged in single columns radially without gaps even if the first and second insulating papers 25a and 25b are disposed inside the first and second coil end rows and between the intersecting portions of the first and second coil ends 22c and 22d between the first and second coil end rows. Consequently, space factor is also increased in Embodiment 3.

Moreover, in Embodiments 1 through 3 above, the winding bodies are configured by winding jointless continuous conductor wires helically, but winding bodies may be configured by winding conductor wires helically that are produced by linking short conductors, for example.

In Embodiments 1 through 3 above, winding bodies are configured by winding conductor wires for four turns into a helical shape, but the number of turns of the conductor wire is not limited to four turns provided that it is greater than or equal to two turns.

In Embodiments 1 through 3 above, the armature winding is constituted by hexagonal coils, but the armature winding is not limited thereto, and may be constituted by wave windings, for example.

Embodiment 4

Figure 39:
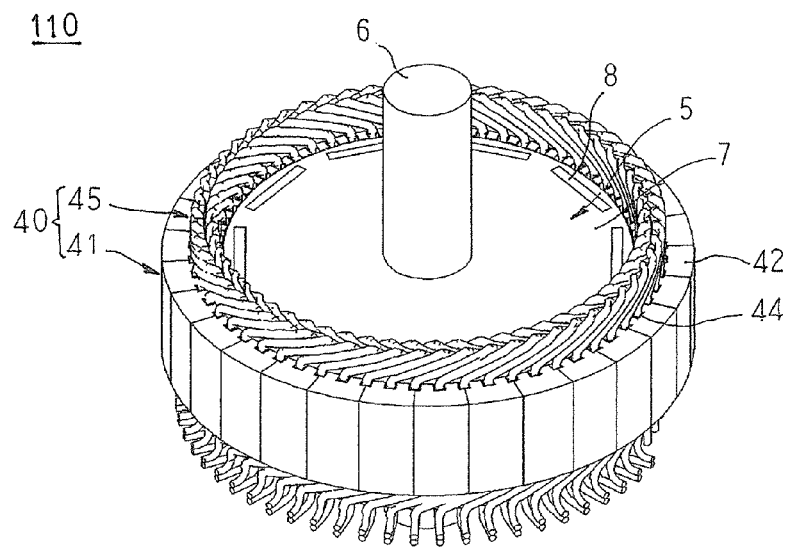
FIG. 39 is an oblique projection that shows part of a rotary electric machine according to Embodiment 4 of the present invention.
Figure 40:
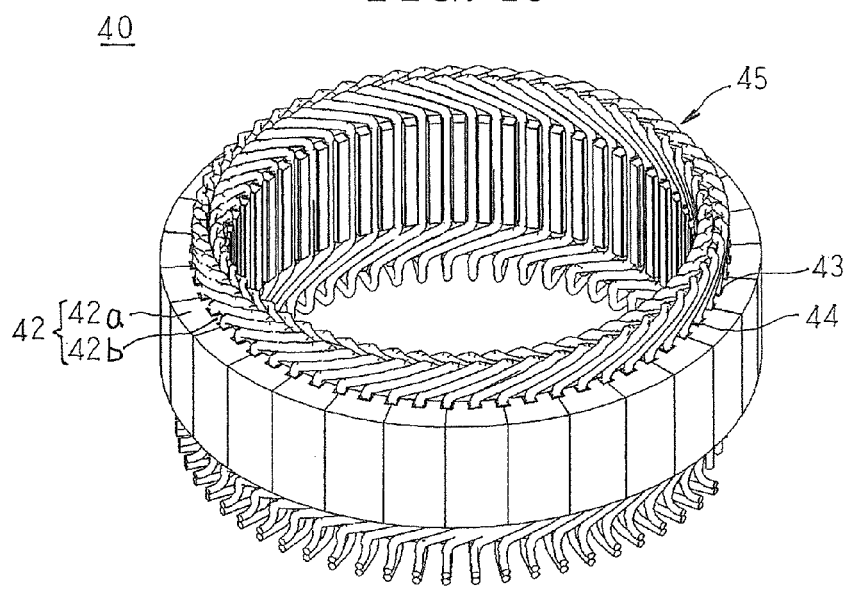
FIG. 40 is an oblique projection that shows an armature that is used in the rotary electric machine according to Embodiment 4 of the present invention.
Figure 41:
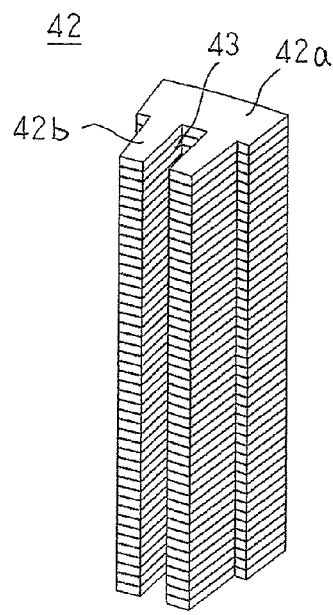
FIG. 41 is an oblique projection that shows a core block that constitutes the armature that is used in the rotary electric machine according to Embodiment 4 of the present invention.
Figure 42:
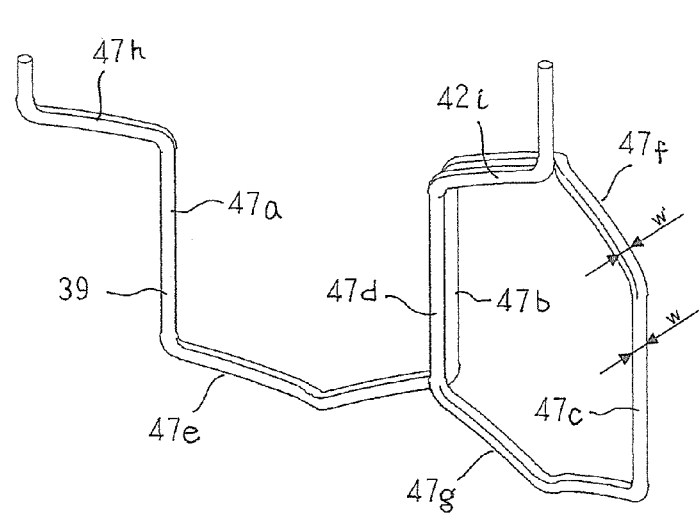
FIG. 42 is an oblique projection that shows a winding body that constitutes an armature winding in the rotary electric machine according to Embodiment 4 of the present invention.
Figure 43:
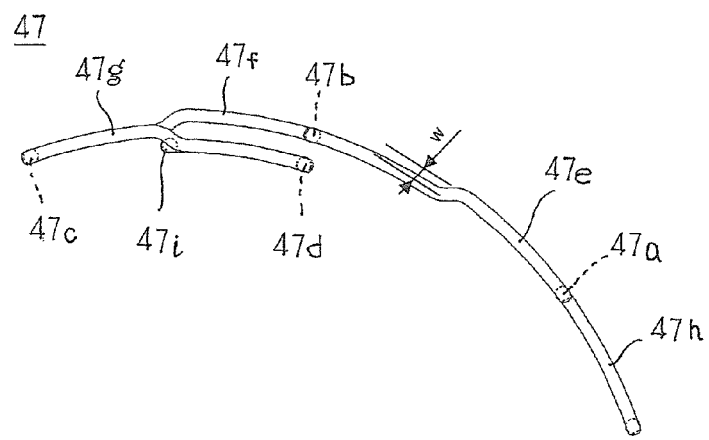
FIG. 43 is a plan that shows the winding body that constitutes the armature winding in the rotary electric machine according to Embodiment 4 of the present invention.
Figure 44:
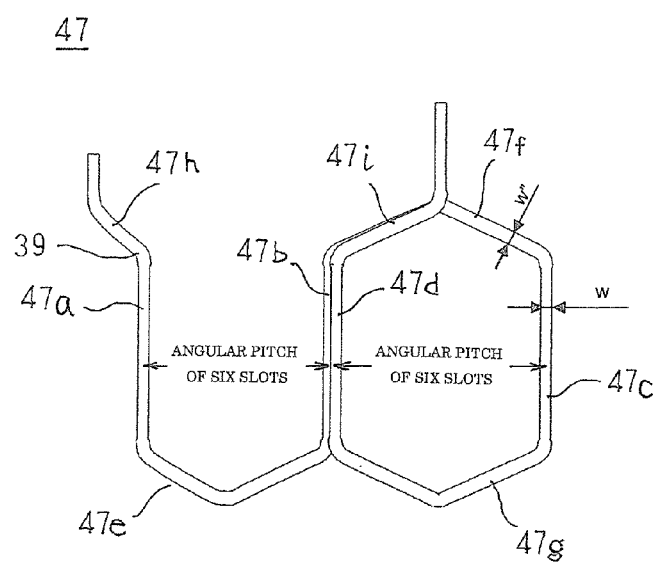
FIG. 44 is a front elevation that shows the winding body that constitutes the armature winding in the rotary electric machine according to Embodiment 4 of the present invention.
Figure 45:
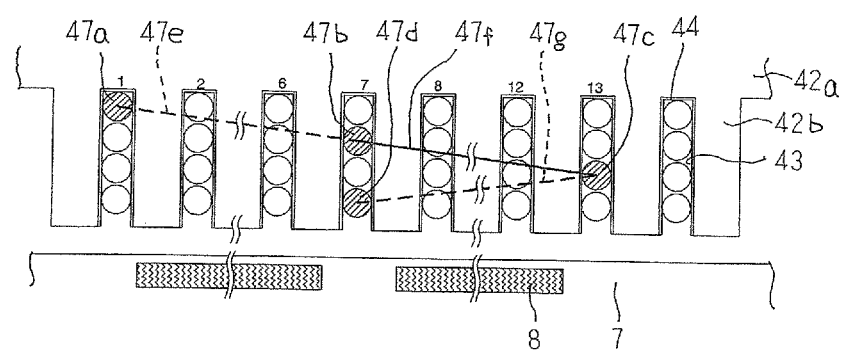
FIG. 45 is a partial cross section that schematically shows a slot-housed state of the winding bodies in the rotary electric machine according to Embodiment 4 of the present invention.

FIG. 39 is an oblique projection that shows part of a rotary electric machine according to Embodiment 4 of the present invention, FIG. 40 is an oblique projection that shows an armature that is used in the rotary electric machine according to Embodiment 4 of the present invention, FIG. 41 is an oblique projection that shows a core block that constitutes the armature that is used in the rotary electric machine according to Embodiment 4 of the present invention, FIG. 42 is an oblique projection that shows a winding body that constitutes an armature winding in the rotary electric machine according to Embodiment 4 of the present invention, FIG. 43 is a plan that shows the winding body that constitutes the armature winding in the rotary electric machine according to Embodiment 4 of the present invention, FIG. 44 is a front elevation that shows the winding body that constitutes the armature winding in the rotary electric machine according to Embodiment 4 of the present invention, and FIG. 45 is a partial cross section that schematically shows a slot-housed state of the winding bodies in the rotary electric machine according to Embodiment 4 of the present invention.

In FIG. 39, a rotary electric machine 110 includes: a housing 1 that has: a floored cylindrical frame 2; and an end plate 3 that closes an opening of the frame 2; an armature 40 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 40.

Next, configuration of the armature 40 will be explained in detail with reference to FIGS. 40 through 45.

As shown in FIG. 40, the armature 40 includes: an annular armature core 41; an armature winding 45 that is mounted to the armature core 41; and slot cells 44 that electrically isolate the armature core 41 and the armature winding 45. Here, to facilitate explanation, the number of poles is ten poles, the number of slots in the armature core 41 is sixty, and the armature winding 45 is a three-phase winding. In other words, the slots are formed on the armature core 41 at a ratio of two slots per phase per pole.

As shown in FIG. 41, core blocks 42 are made by dividing the annular armature core 41 into thirty equal sections circumferentially, and include: a core back portion 42a that has a circular arc-shaped cross section, that is produced by laminating and integrating electromagnetic steel sheets; and two teeth 42b that are disposed so as to protrude radially inward from an inner circumferential wall surface of the core back portion 42a.

The armature core 41 is configured into an annular shape by arranging and integrating thirty core blocks 42 circumferentially by abutting together circumferential side surfaces of the core back portions 42a such that the teeth 42b are oriented radially inward. Sixty slots 43 that are formed by the circumferentially adjacent teeth 42b and the core back portions 42a are arranged at a uniform angular pitch circumferentially so as to be open on an inner circumferential side. The teeth 42b are formed so as to have a tapered shape in which a circumferential width becomes gradually narrower radially inward, and a cross section of the slots 43 that is perpendicular to a central axis of the armature core 42 is rectangular.

The slot cells 14 are formed into angular C shapes by bending and shaping rectangular sheets that are produced by sandwiching a polyimide film between meta-aramid fibers, for example, and are inserted into the slots 43 to isolate the armature core 41 and the armature winding 45 electrically.

The armature winding 45 is constituted by a plurality of winding bodies 47. A winding body 47 is produced by winding a conductor wire 39 that has a circular cross section that has a diameter w, that is made of jointless continuous copper wire or aluminum wire that is coated with an insulating enamel resin, for example, into a δ-shaped coil pattern. Moreover, the winding body 47 may be produced by winding a conductor wire that has a rectangular cross section into the δ-shaped coil pattern.

As shown in FIGS. 42 through 44, the winding bodies 47 include: first, second, third, and fourth rectilinear portions 47a, 47b, 47c, and 47d that form three rows so as to be at an angular pitch of six slots apart; a first coil end portion 47e that links first longitudinal ends of the first and second rectilinear portions 47a and 47b to each other; a second coil end portion 47f that links second longitudinal ends of the second and third rectilinear portions 47b and 47c to each other; a third coil end portion 47g that links first longitudinal ends of the third and fourth rectilinear portions 47c and 47d to each other; a first terminal 47h that extends from a second longitudinal end of the first rectilinear portion 47a; and a second terminal 47i that extends from a second longitudinal end of the fourth rectilinear portion 47d. Moreover, an angular pitch of six slots corresponds to a pitch of one magnetic pole.

Specifically, as shown in FIG. 45, the winding bodies 47 are produced into a δ-shaped coil pattern in which a conductor wire 39 is inserted into a first layer inside the slots 43 at Slot Number 1 from near a first axial end of the armature core 41, extends outward from the slots 43 at Slot Number 1 at a second axial end of the armature core 41, is inserted into a second layer inside the slots 43 at Slot Number 7, which is separated by an angular pitch of six slots in a first circumferential direction, extends outward from the slots 43 at Slot Number 7 at a second axial end of the armature core 41, is inserted into a third layer inside the slots 43 at Slot Number 13, which is separated by an angular pitch of six slots in the first circumferential direction, extends outward from the slots 43 at Slot Number 13 at the second axial end of the armature core 41, is inserted into a fourth layer inside the slots 43 at Slot Number 7, which is separated by an angular pitch of six slots in the second circumferential direction, and extends outward from the slots 43 at Slot Number 7 at the first axial end of the armature core 41.

Here, housed positions of the conductor wire 39 that is housed inside the slots 43 are designated a first layer, a second layer, a third layer, and a fourth layer from radially outside for simplicity. In FIG. 45, 1, 2, etc., through 12, and 13 are slot numbers that are allotted to the slots 43 sequentially in a circumferential direction.

The first rectilinear portion 47a is housed in the first layer inside the slots 43 at Slot Number 1, the second and fourth rectilinear portions 47b and 47d are housed in the second layer and the fourth layer inside the slots 43 at Slot Number 7, and the third rectilinear portion 47c is housed in the third layer inside the slots 43 at Slot Number 13.

The first coil end portion 47e that extends outward at the first axial end of the armature core 41 from the first layer inside the slots 43 at Slot Number 1 maintains its radial position and extends at a constant inclination in the first circumferential direction and axially outward, is displaced by w radially inward at a central portion (the top portion), and subsequently maintains its radial position and extends at a reverse inclination in the first circumferential direction and axially inward to enter the second layer inside the slots 43 at Slot Number 7.

The second coil end portion 47*f* that extends outward at the second axial end of the armature core 41 from the second layer inside the slots 43 at Slot Number 7 maintains its radial position and extends at a constant inclination in the first circumferential direction and axially outward, is displaced by w radially inward at a central portion (the top portion), and subsequently maintains its radial position and extends at a reverse inclination in the first circumferential direction and axially inward to enter the third layer inside the slots 43 at Slot Number 13.

The third coil end portion 47*g* that extends outward at the first axial end of the armature core 41 from the third layer inside the slots 43 at Slot Number 13 maintains its radial position and extends at a constant inclination in the second circumferential direction and axially outward, is displaced by w radially inward at a central portion (the top portion), and subsequently maintains its radial position and extends at a reverse inclination in the second circumferential direction and axially inward to enter the fourth layer inside the slots 43 at Slot Number 7.

The first terminal 47*h* that extends from the first layer inside the slots 43 at Slot Number 1 at the second axial end of the armature core 41 maintains its radial position, extends in the second circumferential direction and axially outward at a constant inclination, and is bent at a central portion (a top portion) to project radially outward.

The second terminal 47*i* that extends from the fourth layer inside the slots 43 at Slot Number 7 at the second axial end of the armature core 41 maintains its radial position, extends in the first circumferential direction and axially outward at a constant inclination, and is bent at a central portion (a top portion) to project radially outward.

Thus, the first through third coil ends 47*e*, 47*f*, and 47*g* have crank portions that displace radially by the radial width w of the conductor wires 39 at top portions. The first through fourth rectilinear portions 47*a*, 47*b*, 47*c*, and 47*d* are formed so as to have circular cross sections of diameter w. The first through third coil ends 47*e*, 47*f*, and 47*g* and the first and second terminals 47*h* and 47*i* are deformed by applying pressure to the conductor wire 39 that has a circular cross section from two radial sides using parallel flat plates, for example, so as to have flat cross sections that have a radial thickness w' (where w'<w), and an axial thickness w" (where w">w).

Figure 46:
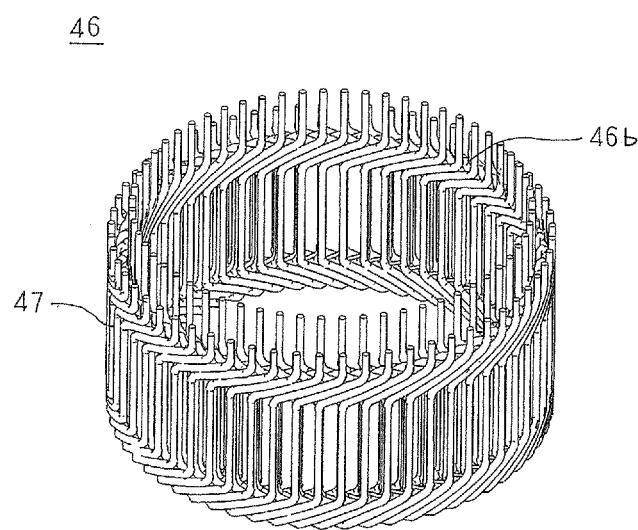
FIG. 46 is an oblique projection that shows a winding assembly that constitutes the armature winding of the armature that is used in the rotary electric machine according to Embodiment 4 of the present invention.

Sixty winding bodies 47 that are produced in this manner are arranged into an annular shape circumferentially at a pitch of one slot to produce a winding assembly 46, as shown in FIG. 46. At a first axial end of this winding assembly 46, a first coil end row that is configured by arranging the first coil ends 47*e* at a pitch of one slot circumferentially and a third coil end row that is configured by arranging the third coil ends 47*g* at a pitch of one slot circumferentially are lined up in two layers in a radial direction to constitute a first coil end group 46*a*. At a second axial end of this winding assembly 46, a second coil end row that is configured by arranging the second coil ends 47*f* at a pitch of one slot circumferentially constitutes a second coil end group. In addition, end portions of the first terminals 47*h* that extend axially outward are arranged at a pitch of one slot circumferentially around a radially outer side of the second coil end group 46*b* that is constituted by the second coil end row 46*b*. Furthermore, end portions of the second terminals 47*i* that extend axially outward are arranged at a pitch of one slot circumferentially around a radially inner side of the second coil end group 46*b* that is constituted by the second coil end row.

Figure 47:
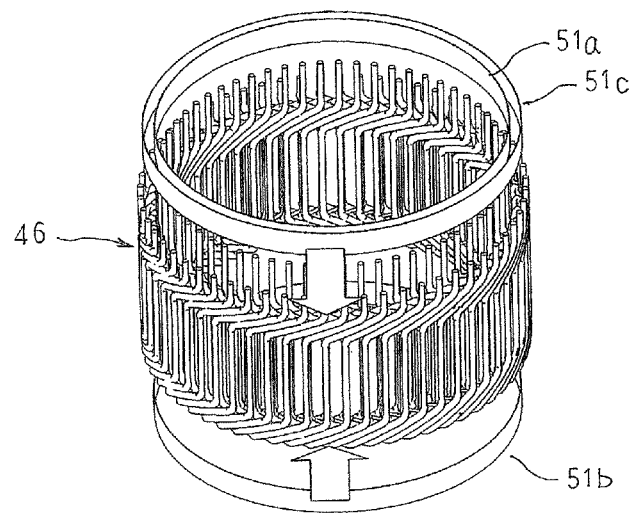
FIG. 47 is an oblique projection that explains a method for mounting insulating papers to the winding assembly in the rotary electric machine according to Embodiment 4 of the present invention.

Next, a method for mounting insulating papers to the winding assembly 46 will be explained with reference to FIGS. 47 through 50. FIG. 47 is an oblique projection that explains a method for mounting insulating papers to the winding assembly in the rotary electric machine according to Embodiment 4 of the present invention, FIG. 48 is a schematic cross section that explains the method for mounting insulating papers to the winding assembly in the rotary electric machine according to Embodiment 4 of the present invention, FIG. 49 is an oblique projection that explains a mounted state of insulating papers in the winding assembly in the rotary electric machine according to Embodiment 4 of the present invention, and FIG. 50 is a schematic cross section that explains the mounted state of insulating papers in the winding assembly in the rotary electric machine according to Embodiment 4 of the present invention.

First, a rectilinear insulating material is wound for a little less than two laps using rollers in a similar or identical manner to the insulating papers 25 in Embodiment 1 above to produce three kinds of cylindrical insulating paper 51*a*, 51*b*, and 51*c* that have different diameters.

Figure 48:
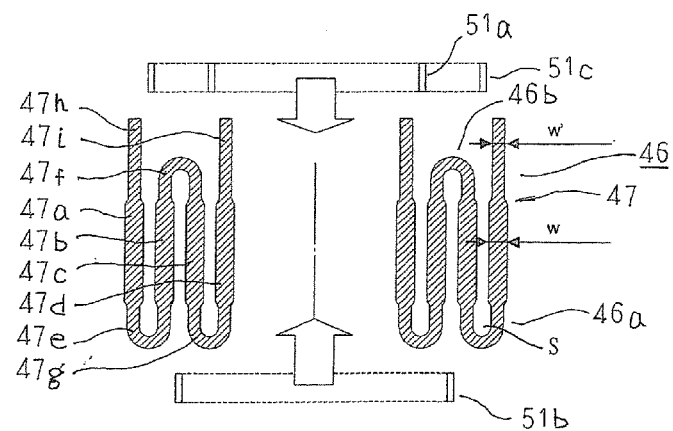
FIG. 48 is a schematic cross section that explains the method for mounting insulating papers to the winding assembly in the rotary electric machine according to Embodiment 4 of the present invention.

Next, as shown in FIGS. 47 and 48, an insulating paper 51*b* is inserted between the first coil end row and the third coil end row from the first axial end, and is moved toward the second axial end so as to pass between the second rectilinear portions 47*b* and the third rectilinear portions 47*c*. An insulating paper 51*a* is inserted between a second terminal row and the second coil end row from the second axial end, and is moved toward the first axial end so as to pass between the third rectilinear portions 47*c* and the fourth rectilinear portions 47*d*. An insulating paper 51*c* is inserted between a first terminal row and the second coil end row from the second axial end, and is moved toward the first axial end so as to pass between the first rectilinear portions 47*a* and the second rectilinear portions 47*b*.

Figure 49:
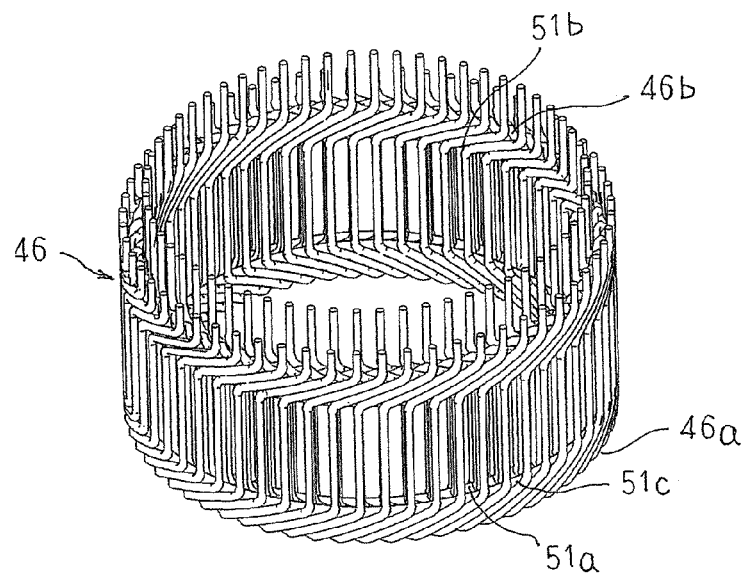
FIG. 49 is an oblique projection that explains a mounted state of insulating papers in the winding assembly in the rotary electric machine according to Embodiment 4 of the present invention.
Figure 50:
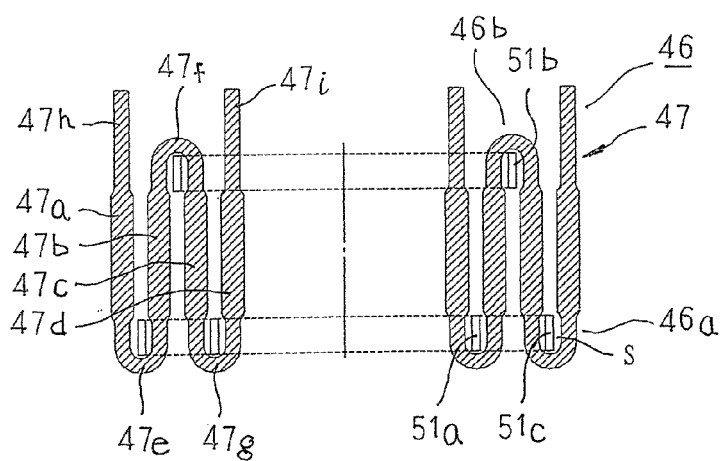
FIG. 50 is a schematic cross section that explains the mounted state of insulating papers in the winding assembly in the rotary electric machine according to Embodiment 4 of the present invention.

Thus, as shown in FIGS. 49 and 50, the insulating paper 51*b* is disposed inside the second coil end row, the insulating paper 51*a* is disposed inside the third coil end row, and the insulating paper 51*c* is disposed inside the first coil end row. The insulating papers 51*a*, 51*b*, and 51*c* are inserted into gaps S that are formed inside the first through third coil ends 47*e*, 47*f*, and 47*g* in which respective radial widths are reduced.

Figure 51:
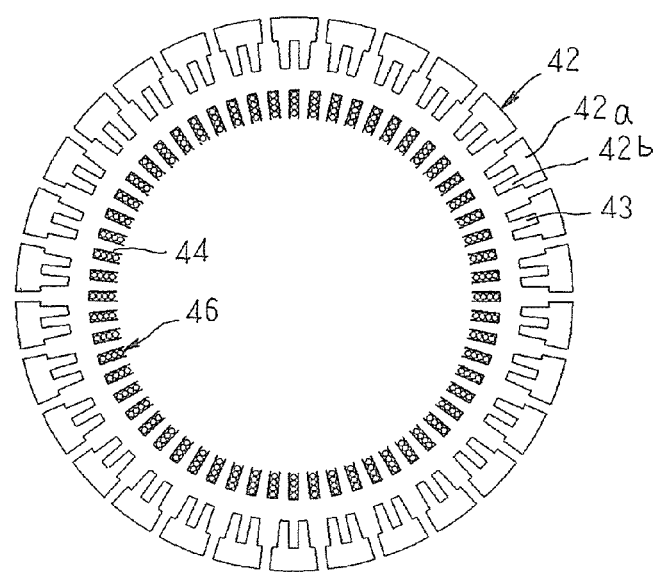
FIG. 51 is an end elevation that shows a state before mounting the winding assembly to the armature core in the rotary electric machine according to Embodiment 4 of the present invention.
Figure 52:
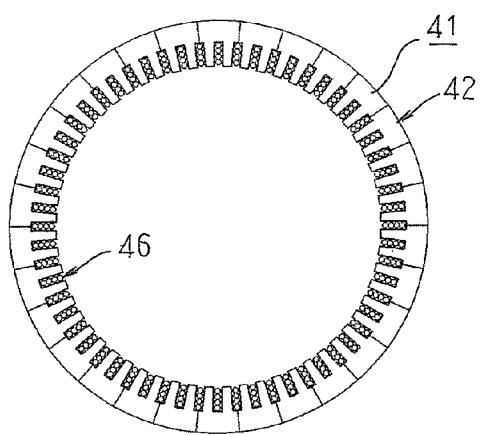
FIG. 52 is an end elevation that shows a mounted state of the winding assembly in the armature core in the rotary electric machine according to Embodiment 4 of the present invention.
Figure 53:
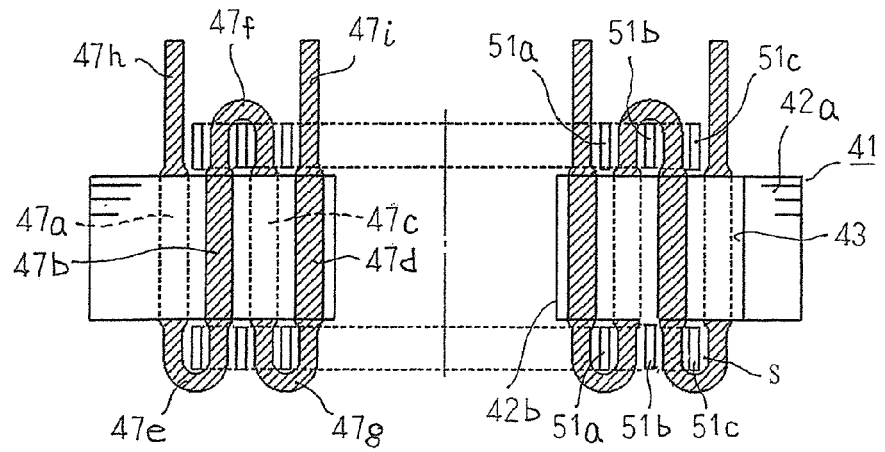
FIG. 53 is a schematic cross section that shows a mounted state of the winding assembly in the armature core in the rotary electric machine according to Embodiment 4 of the present invention.

Next, a method for mounting the winding assembly 46 to the armature core 41 will be explained with reference to FIGS. 51 through 53. FIG. 51 is an end elevation that shows a state before mounting the winding assembly to the armature core in the rotary electric machine according to Embodiment 4 of the present invention, FIG. 52 is an end elevation that shows a mounted state of the winding assembly in the armature core in the rotary electric machine according to Embodiment 4 of the present invention, and FIG. 53 is a schematic cross section that shows a mounted state of the winding assembly in the armature core in the rotary electric machine according to Embodiment 4 of the present invention. Moreover, in FIGS. 51 and 52, for simplicity only the first through fourth rectilinear portions 47*a*, 47*b*, 47*c*, and 47*d* of the winding assembly 46 are depicted, and the insulating papers 51*a*, 51*b*, and 51*c* are omitted.

The slot cells 44 are first mounted onto each of the columns of first through fourth rectilinear portions 47*a*, 47*b*, 47*c*, and 47*d*, which are arranged in single columns radially. Next, the thirty core blocks 42 are arranged at a uniform angular pitch on an outer circumferential side of the winding assembly 46 such that the teeth 42b are positioned on a radially outer side between the columns of first through fourth rectilinear portions 47a, 47b, 47c, and 47d, as shown in FIG. 51.

Next, the thirty core blocks 42 that are arranged circumferentially are simultaneously moved radially inward. The teeth 42b are inserted between the columns of first through fourth rectilinear portions 47a, 47b, 47c, and 47d by this radially inward movement of the core blocks 42. Then, radially inward movement of the core blocks 42 is prevented by the circumferential side surfaces of the core back portions 42a of the adjacent core blocks 42 contacting each other.

The core blocks 42 are thereby arranged into an annular shape by placing the circumferential side surfaces of the core back portions 12a in contact with each other to constitute the armature core 41. The winding assembly 46 is mounted to the armature core 41 such that the respective columns of first through fourth rectilinear portions 47a, 47b, 47c, and 47d are also housed inside the slots 43.

In addition, as shown in FIG. 53, the insulating paper 51b is inserted into the gap S that is formed between the first coil end row and the third coil end row from a side near the first axial end, and the insulating papers 51a and 51c are inserted into the gap S that is formed between the second terminal row and the second coil end row, and into the gap S that is formed between the first terminal row and the second coil end row, from a side near the second axial end. A set connection process is subsequently applied to the first terminals 47h and the second terminals 47i to produce the armature winding 45 and to obtain the armature 40.

In Embodiment 4, because the insulating papers 51a, 51b, and 51c are disposed inside the first through third coil end rows, between the first terminal row and the second coil end row, between the second terminal row and the second coil end row, and between the first coil end row and the third coil end row, sufficient interphase insulation performance can also be ensured without changing the thickness or material of the insulating coatings of the first through third coil ends 47e, 47f, and 47g.

According to Embodiment 4, a radial thickness of the first through third coil ends 47e, 47f, and 47g, the first terminals 47h, and the second terminals 47i is made thinner than a radial thickness of the first through fourth rectilinear portions 47a, 47b, 47c, and 47d. Thus, because gaps S into which the insulating papers 51a, 51b, and 51c can be inserted can be formed inside the first through third coil end rows, between the first terminal row and the second coil end row, between the second terminal row and the second coil end row, and between the first coil end row and the third coil end row, radial spreading of the first and second coil end groups 46a and 46b is suppressed while ensuring sufficient interphase insulation performance, enabling size reductions to be achieved.

Moreover, in Embodiment 4 above, the insulating papers 51a, 51b, and 51c are disposed in gaps S that are formed by reducing the radial thickness of the first through third coil ends 47e, 47f, and 47g, the first terminals 47h, and the second terminals 47i of the winding body, but the insulating papers 51a, 51b, and 51c may be disposed in gaps S that are formed by displacing the first through third coil ends 47e, 47f, and 47g, the first terminals 47h, and the second terminals 47i of the winding body radially relative to first through fourth the rectilinear portions 47a, 47b, 47c, and 47d, in a similar or identical manner to that of Embodiment 3 above.

In Embodiment 4 above, no mention is made of the thickness of the insulating papers 51a, 51b, and 51c, but it is preferable that the thickness of the insulating papers 51a, 51b, and 51c be made thinner than (w–w') from a viewpoint of suppressing radial spreading of the first and second coil end groups 46a and 46b.

In Embodiment 4 above, cylindrical insulating papers 51a, 51b, and 51c are used, but strip-shaped insulating papers that are formed by dividing the cylindrical insulating papers 51a, 51b, and 51c plurally in a circumferential direction may be used.

Embodiment 5

Figure 54:
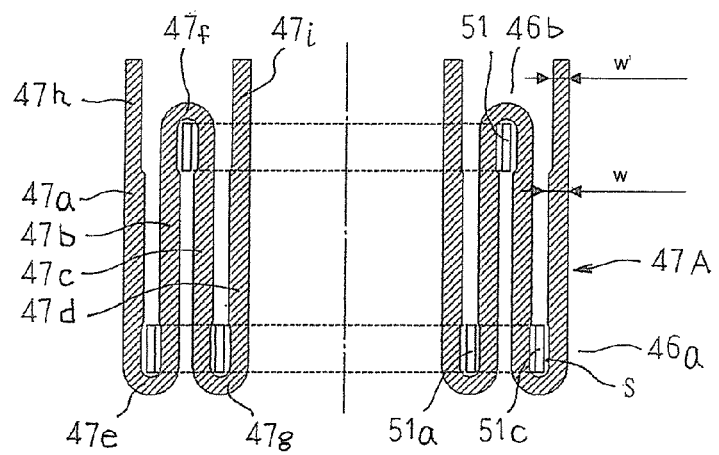
FIG. 54 is a schematic cross section that explains a mounted state of insulating papers in a winding assembly in a rotary electric machine according to Embodiment 5 of the present invention.

FIG. 54 is a schematic cross section that explains a mounted state of insulating papers in a winding assembly in a rotary electric machine according to Embodiment 5 of the present invention.

In the winding body 47 according to Embodiment 4 above, the first, second, and third coil ends 47e, 47f, and 47g, and the first and second terminals 47h and 47i, are deformed from two radial sides so as to reduce the radial thickness to make the radial thickness w', but in a winding body 47A according to Embodiment 5, second and third coil ends 47f and 47g and first and second terminals 47h and 47i are deformed from one radial side so as to reduce radial thickness to make the radial thickness w', as shown in FIG. 54.

Moreover, the rest of the configuration is formed in a similar or identical manner to that of Embodiment 4 above.

In Embodiment 5, because the insulating papers 51a, 51b, and 51c are disposed inside the first through third coil end rows, between the first terminal row and the second coil end row, between the second terminal row and the second coil end row, and between the first coil end row and the third coil end row, sufficient interphase insulation performance can also be ensured without changing the thickness or material of the insulating coatings of the first, second, and third coil ends 47e, 47f, and 47g.

The radial thickness of the first, second, and third coil ends 47e, 47f, and 47g, the first terminals 47h and the second terminals 47i is made thinner than the radial thickness of the first, second, third, and fourth rectilinear portions 47a, 47b, 47c, and 47d. Thus, because gaps S into which the insulating papers 51a, 51b, and 51c can be inserted can be formed inside the first, second, and third coil end rows, between the first terminal row and the second coil end row, between the second terminal row and the second coil end row, and between the first coil end row and the third coil end row, radial spreading of the first and second coil end groups 46a and 46b is suppressed while ensuring sufficient interphase insulation performance, enabling size reductions to be achieved.

Embodiment 6

Figure 55:
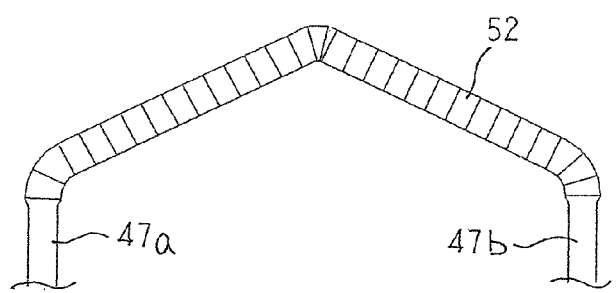
FIG. 55 is a partial front elevation that shows a coil end of a winding body that constitutes an armature winding in a rotary electric machine according to Embodiment 6 of the present invention.
Figure 56:
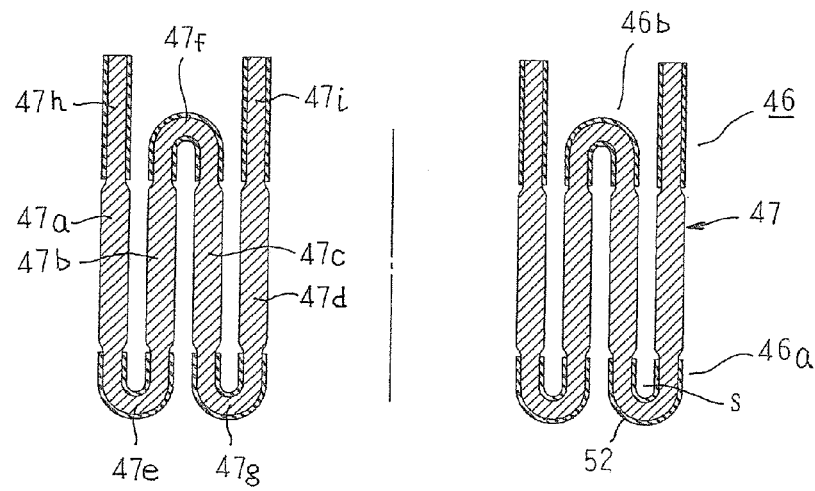
FIG. 56 is a schematic cross section that explains an insulated state of a winding assembly in the rotary electric machine according to Embodiment 6 of the present invention.

FIG. 55 is a partial front elevation that shows a coil end of a winding body that constitutes an armature winding in a rotary electric machine according to Embodiment 6 of the present invention, and FIG. 56 is a schematic cross section that explains an insulated state of a winding assembly in the rotary electric machine according to Embodiment 6 of the present invention.

In FIGS. 55 and 56, insulating tape 52 is wound onto first, second, and third coil ends 47e, 47f, and 47g, and first and second terminals 47h and 47i, of the winding body 47.

Moreover, the rest of the configuration is formed in a similar or identical manner to that of Embodiment 4 above.

In Embodiment 6, because insulating tape 52 is wound onto first, second, and third coil ends 47e, 47f, and 47g, and first and second terminals 47h and 47i, in which radial thickness is reduced, the thickness of the wound insulating tape 52 is absorbed by the amount of reduction in the radial thickness of the first, second, and third coil ends 47e, 47f, and 47g, and the first and second terminals 47h and 47i, enabling required insulating distance to be ensured. Thus, radial spreading of the first and second coil end groups 46a and 46b is suppressed while ensuring sufficient interphase insulation performance, enabling size reductions to be achieved. Because the insulating papers 51a, 51b, and 51c are not required, the occurrence of decreases in interphase insulation performance that result from misalignment of the insulating papers 51a, 51b, and 51c can be prevented.

Similar or identical effects are also exhibited in Embodiments 2 and 3 above by winding insulating tape 52 onto the first and second coil ends 22c and 22d, and the winding ends 22g and 22h, instead of the insulating papers 25a and 25b.

Embodiment 7

Figure 57:
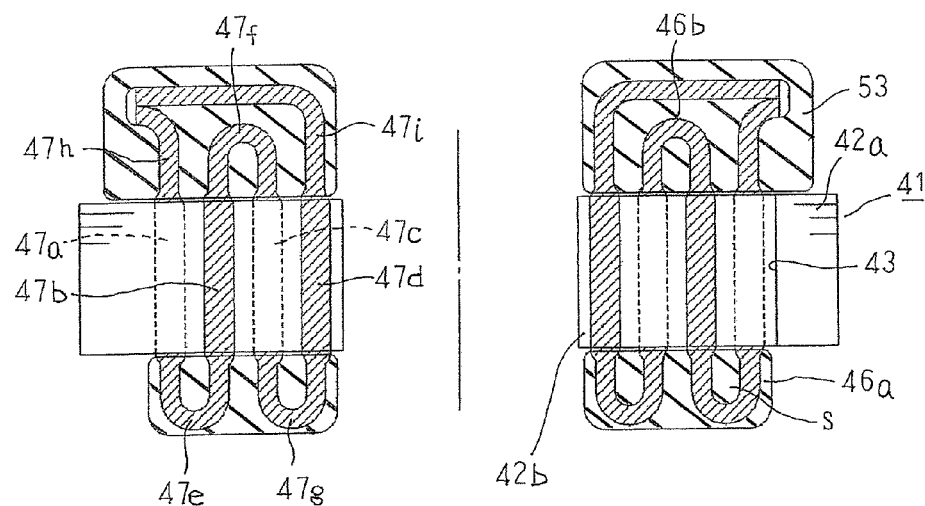
FIG. 57 is a schematic cross section that explains an insulated state of a winding assembly in a rotary electric machine according to Embodiment 7 of the present invention.

FIG. 57 is a schematic cross section that explains an insulated state of a winding assembly in a rotary electric machine according to Embodiment 7 of the present invention.

In Embodiment 7, an winding body 47 is mounted to an armature core 41, first and second terminals 47h and 47i are joined, and then an insulating resin 53 that is constituted by an epoxy resin, etc., that constitutes a thermosetting resin, is applied to the first and second coil end groups 46a and 46b, and is heated and hardened.

Moreover, the rest of the configuration is formed in a similar or identical manner to that of Embodiment 4 above.

In Embodiment 7, because radial widths of the first, second, and third coil ends 47e, 47f, and 47g, and of the first and second terminals 47h and 47i, are reduced, gaps S are formed inside the first, second, and third coil end rows, between the first terminal row and the second coil end row, between the second terminal row and the second coil end row, and between the first coil end row and the third coil end row. Thus, the insulating resin 53 that is applied to the first and second coil end groups flows in between the first terminal row and the second coil end row, between the second terminal row and the second coil end row, and between the first coil end row and the third coil end row, and is filled so as to leave no gaps, suppressing the occurrence of insulation failure, and enabling interphase insulation performance to be improved.

Moreover, in Embodiment 7 above, an insulating resin that is constituted by a thermosetting resin is used, but an insulating resin that is constituted by a thermoplastic resin may be used. Alternatively, an insulating powder may be applied to the first and second coil end groups by powder coating, etc.

Similar or identical effects are also exhibited in Embodiments 2 and 3 above by applying an insulating resin 53 to the first and second coil end groups, instead of the insulating papers 25a and 25b.

Moreover, in Embodiments 4 through 7 above, the winding bodies 47 are produced by winding conductor wires 39 into a δ-shaped coil pattern for one turn, but winding bodies may be produced by winding conductor wires into a δ-shaped coil pattern for two or more turns. In other words, winding bodies may be configured in series by arranging the δ-shaped coil patterns in two or more layers in a radial direction, and linking together winding ends of two δ-shaped coil patterns using crossover wires.

In each of the above embodiments, cases in which the present application has been applied to an electric motor have been explained, but similar or identical effects are also exhibited if the present application is applied to a generator.

In each of the above embodiments, the armature winding is constituted by a full-pitch distributed winding, but the armature winding may be a long-pitch distributed winding, or may be a short-pitch distributed winding.

In each of the above embodiments, an eight-pole forty-eight-slot or a ten-pole sixty-slot rotary electric machine has been explained, but it goes without saying that the number of poles and the number of slots are not limited to eight poles and forty-eight slots or to ten poles and sixty slots.

In each of the above embodiments, slots are formed at a ratio of two slots per phase per pole, but the number of slots per phase per pole is not limited to two, and may be one, or may be three or greater. If the number of slots per phase per pole is one, for example, then an angular pitch of three slots is a pitch of one magnetic pole.

The invention claimed is:

1. A rotary electric machine comprising:
an armature that includes:
an annular armature core in which slots are arranged circumferentially; and
an armature winding that is mounted to said armature core,
wherein:
said armature winding includes a plurality of winding bodies that are each formed by winding a conductor wire that is covered by an insulating coating, and that include:
rectilinear portions; and
coil ends that link together end portions of said rectilinear portions between columns;
said plurality of winding bodies are arranged circumferentially such that said rectilinear portions of each of said winding bodies are arranged in two columns that are housed in pairs of slots that are separated by an angular pitch of n slots, where n is an integer that is greater than or equal to 2;
2m of said rectilinear portions are housed in each of said slots so as to line up in a single column in a radial direction, where m is an integer that is greater than or equal to 2;
said coil ends include first coil ends that each extend outward from said slot pairs at a first axial end of said armature core, said first coil ends being arranged at a pitch of one slot in a circumferential direction to form a first coil end row, and m layers of said first coil rows being arranged in a radial direction to configure a first coil end group;
said coil ends include second coil ends that each extend outward from said slot pairs at a second axial end of said armature core, said second coil ends being arranged at a pitch of one slot in a circumferential direction to form a second coil end row, and (m−1) layers of said second coil rows being arranged in a radial direction to configure a second coil end group; and
a cylindrical insulating member that is different than said insulating coating is disposed inside said first coil end rows, between said first coil end rows, inside said second coil end rows, and between said second coil end rows.

2. The rotary electric machine according to claim 1, wherein said insulating member comprises:
a sheet-shaped first insulating paper that is disposed inside said first coil end rows and inside said second coil end rows; and a sheet-shaped second insulating paper that is disposed between said first coil end rows and between said second coil end rows.

3. The rotary electric machine according to claim 2, wherein said first insulating paper and said second insulating paper are each configured into a cylindrical shape by winding a single strip-shaped body for less than q laps, where q is an integer that is greater than or equal to 2.

4. The rotary electric machine according to claim 1, wherein a radial dimension of said first coil ends is formed so as to be less than a radial dimension of said rectilinear portions, and a radial dimension of said second coil ends is formed so as to be less than said radial dimension of said rectilinear portions, such that a gap that houses said insulating member is formed inside said first coil end rows, between said first coil end rows, inside said second coil end rows, and between said second coil end rows.

5. The rotary electric machine according to claim 1, wherein said first coil ends are displaced radially relative to said rectilinear portions, and said second coil ends are displaced radially relative to said rectilinear portions, such that a gap that houses said insulating member is formed inside said first coil end rows, between said first coil end rows, inside said second coil end rows, and between said second coil end rows.

6. A manufacturing method for a rotary electric machine according to claim 2, said manufacturing method for said rotary electric machine comprising:
   a step of producing said plurality of winding bodies;
   a step of producing a winding assembly in which said winding bodies are arranged at a pitch of one slot in a circumferential direction, rectilinear portion columns that are configured by arranging said rectilinear portions in single columns radially are arranged at a pitch of one slot in a circumferential direction, said first coil end rows that are configured by arranging said first coil ends at a pitch of one slot in a circumferential direction are arranged in m layers or in 2p layers in a radial direction, and said second coil end rows that are configured by arranging said second coil ends at a pitch of one slot in a circumferential direction are arranged in (m−1) layers or in (2p−1) layers in a radial direction;
   a step of mounting said winding assembly to said armature core;
   a first insulating paper mounting step in which said first insulating paper is housed inside said first coil end rows and said second coil end rows; and
   a second insulating paper mounting step in which said second insulating paper is housed between said first coil end rows and between said second coil end rows.

7. The manufacturing method for a rotary electric machine according to claim 6, wherein in said first insulating paper mounting step, before said step of mounting said winding assembly to said armature core, said first insulating paper is inserted between said second coil end rows of said winding assembly from axially outside and is passed between rectilinear portions that are adjacent to each other in a radial direction of said rectilinear portion columns to be housed inside said first coil end rows, and said first insulating paper is inserted between said first coil end rows of said winding assembly from axially outside and is passed between rectilinear portions that are adjacent to each other in a radial direction of said rectilinear portion columns to be housed inside said second coil end rows.

8. The manufacturing method for a rotary electric machine according to claim 6, wherein said first insulating paper and said second insulating paper are prepared using a strip-shaped body that is produced by cutting an insulating sheet that is fed from a roll body such that a direction that is perpendicular to a feed direction is made a longitudinal direction.

9. A rotary electric machine comprising:
   an armature that includes:
      an annular armature core in which slots are arranged circumferentially; and
      an armature winding that is mounted to said armature core,
   wherein:
      said armature winding includes a plurality of winding bodies that are each produced by winding a jointless continuous conductor wire that is covered by an insulating coating, and that are arranged at a pitch of one slot in a circumferential direction so as to be mounted into a first slot, a second slot, and a third slot that line up at an angular pitch of n slots in a circumferential direction, where n is an integer that is greater than or equal to 2;
      said winding bodies are configured by repeatedly winding a δ-shaped coil pattern that is formed by inserting said conductor wire sequentially into said first slot, said second slot, said third slot, and said second slot, so as to alternate an axial direction of insertion into said first slot, said second slot, and said third slot, for p turns in a radial direction, where p is an integer that is greater than or equal to 1, and have:
         rectilinear portions that are housed in said first slot, said second slot, and said third slot; and
         coil ends that link together end portions of said rectilinear portions that are housed in pairs of slots that are separated by said angular pitch of n slots;
      4p of said rectilinear portions of said winding bodies are housed in each of said slots so as to line up in a single column in a radial direction;
      said coil ends include first coil ends that each extend outward from said slot pairs at a first axial end of said armature core, said first coil ends being arranged at a pitch of one slot in a circumferential direction to form a first coil end row, and 2p layers of said first coil rows being arranged in a radial direction to configure a first coil end group;
      said coil ends include second coil ends that each extend outward from said slot pairs at a second axial end of said armature core, said second coil ends being arranged at a pitch of one slot in a circumferential direction to form a second coil end row, and (2p−1) layers of said second coil rows being arranged in a radial direction to configure a second coil end group; and
      a cylindrical insulating member that is different than said insulating coating is disposed inside said first coil end rows, between said first coil end rows, inside said second coil end rows, and between said second coil end rows.

10. The rotary electric machine according to claim 9, wherein said insulating member comprises:
    a sheet-shaped first insulating paper that is disposed inside said first coil end rows and inside said second coil end rows; and
    a sheet-shaped second insulating paper that is disposed between said first coil end rows and between said second coil end rows.

11. The rotary electric machine according to claim 10, wherein said first insulating paper and said second insulating paper are each configured into a cylindrical shape by winding a single strip-shaped body for less than q laps, where q is an integer that is greater than or equal to 2.

12. The rotary electric machine according to claim 9, wherein a radial dimension of said first coil ends is formed so as to be less than a radial dimension of said rectilinear portions, and a radial dimension of said second coil ends is formed so as to be less than said radial dimension of said rectilinear portions, such that a gap that houses said insulating member is formed inside said first coil end rows, between said first coil end rows, inside said second coil end rows, and between said second coil end rows.

13. The rotary electric machine according to claim 9, wherein said first coil ends are displaced radially relative to said rectilinear portions, and said second coil ends are displaced radially relative to said rectilinear portions, such that a gap that houses said insulating member is formed inside said first coil end rows, between said first coil end rows, inside said second coil end rows, and between said second coil end rows.

14. A manufacturing method for a rotary electric machine according to claim 10, said manufacturing method for said rotary electric machine comprising:
   a step of producing said plurality of winding bodies;
   a step of producing a winding assembly in which said winding bodies are arranged at a pitch of one slot in a circumferential direction, rectilinear portion columns that are configured by arranging said rectilinear portions in single columns radially are arranged at a pitch of one slot in a circumferential direction, said first coil end rows that are configured by arranging said first coil ends at a pitch of one slot in a circumferential direction are arranged in m layers or in 2p layers in a radial direction, and said second coil end rows that are configured by arranging said second coil ends at a pitch of one slot in a circumferential direction are arranged in (m−1) layers or in (2p−1) layers in a radial direction;
   a step of mounting said winding assembly to said armature core;
   a first insulating paper mounting step in which said first insulating paper is housed inside said first coil end rows and said second coil end rows; and
   a second insulating paper mounting step in which said second insulating paper is housed between said first coil end rows and between said second coil end rows.

15. The manufacturing method for a rotary electric machine according to claim 14, wherein in said first insulating paper mounting step, before said step of mounting said winding assembly to said armature core, said first insulating paper is inserted between said second coil end rows of said winding assembly from axially outside and is passed between rectilinear portions that are adjacent to each other in a radial direction of said rectilinear portion columns to be housed inside said first coil end rows, and said first insulating paper is inserted between said first coil end rows of said winding assembly from axially outside and is passed between rectilinear portions that are adjacent to each other in a radial direction of said rectilinear portion columns to be housed inside said second coil end rows.

16. The manufacturing method for a rotary electric machine according to claim 14, wherein said first insulating paper and said second insulating paper are prepared using a strip-shaped body that is produced by cutting an insulating sheet that is fed from a roll body such that a direction that is perpendicular to a feed direction is made a longitudinal direction.

* * * * *